(12) United States Patent　(10) Patent No.: US 10,964,922 B2
Brooks, III et al.　(45) Date of Patent: Mar. 30, 2021

(54) BATTERY WITH ENHANCED RESISTANCE TO DENDRITE FORMATION

(71) Applicant: Pacesetter, Inc., Sunnyvale, CA (US)

(72) Inventors: Del Charles Brooks, III, Seneca, SC (US); Christopher Hallmark, Pickens, SC (US); John Duggan, Greenville, SC (US); Jeffrey Armstrong, Pickens, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 37 days.

(21) Appl. No.: 16/233,275

(22) Filed: Dec. 27, 2018

(65) Prior Publication Data

US 2019/0131593 A1　May 2, 2019

Related U.S. Application Data

(63) Continuation of application No. 15/815,217, filed on Nov. 16, 2017, now Pat. No. 10,727,454.

(60) Provisional application No. 62/553,551, filed on Sep. 1, 2017, provisional application No. 62/448,843, filed on Jan. 20, 2017, provisional application No. 62/423,081, filed on Nov. 16, 2016.

(51) Int. Cl.
| | |
|---|---|
| *H01M 2/02* | (2006.01) |
| *H01M 2/06* | (2006.01) |
| *H01M 4/131* | (2010.01) |
| *H01M 4/133* | (2010.01) |
| *C01G 5/00* | (2006.01) |
| *C01G 31/02* | (2006.01) |

(52) U.S. Cl.
CPC ......... *H01M 2/021* (2013.01); *H01M 2/0242* (2013.01); *H01M 2/06* (2013.01); *H01M 4/131* (2013.01); *H01M 4/133* (2013.01); *C01G 5/00* (2013.01); *C01G 31/02* (2013.01); *H01M 2/0207* (2013.01); *H01M 2/0277* (2013.01); *H01M 2/065* (2013.01)

(58) Field of Classification Search
CPC ...... H01M 2/021; H01M 2/06; H01M 2/0242; H01M 4/131; H01M 4/133; H01M 2/0207; H01M 2/0277; H01M 2/065; C01G 5/00; C01G 31/02
See application file for complete search history.

(56) References Cited

U.S. PATENT DOCUMENTS

| | | |
|---|---|---|
| 600,469 A | 3/1898 | Wister |
| 3,956,576 A | 5/1976 | Jensen et al. |
| 4,192,911 A | 3/1980 | Topouzian |
| 4,315,974 A | 2/1982 | Athearn et al. |
| 4,587,182 A | 5/1986 | Stiles et al. |
| 5,180,642 A | 1/1993 | Weiss et al. |
| 5,254,415 A | 10/1993 | Williams et al. |
| 5,643,694 A | 7/1997 | Heller, Jr. |
| 5,667,916 A | 9/1997 | Ebel et al. |
| 5,716,729 A | 2/1998 | Sunderland et al. |
| 5,744,261 A | 4/1998 | Muffoletto et al. |
| 5,882,362 A | 3/1999 | Muffoletto et al. |
| 6,551,747 B1 | 4/2003 | Gan |
| 6,762,396 B2 | 7/2004 | Abbott et al. |
| 6,899,976 B2 | 5/2005 | Larson et al. |
| 7,432,001 B1 | 10/2008 | Takeuchi et al. |
| 7,482,093 B1 | 1/2009 | Frustaci et al. |
| 7,611,805 B2 | 11/2009 | Frustaci et al. |
| 7,695,859 B2 | 4/2010 | Nielsen et al. |
| 9,281,507 B2 | 3/2016 | Bruch et al. |
| 9,355,789 B2 | 5/2016 | Krehl et al. |
| 9,601,779 B2 | 3/2017 | Visco et al. |
| 9,614,263 B2 | 4/2017 | Yang et al. |
| 9,735,434 B2 | 8/2017 | Ferraro et al. |
| 9,765,271 B2 | 9/2017 | Myrick |
| 2004/0258988 A1 | 12/2004 | Nielsen et al. |
| 2005/0002147 A1 | 1/2005 | Nielsen et al. |
| 2006/0166078 A1 | 7/2006 | Chen et al. |
| 2007/0178383 A1 | 8/2007 | Viavattine et al. |
| 2012/0003506 A1 | 1/2012 | Shin |

(Continued)

FOREIGN PATENT DOCUMENTS

| | | |
|---|---|---|
| EP | 2551940 A2 | 1/2013 |
| EP | 3229305 A1 | 10/2017 |

(Continued)

OTHER PUBLICATIONS

"Plasma Sprayed Ceramic Coatings", Ceramic Industry, Jun. 2002.
Bakan et al., "Application of High-Velocity Oxygen-Fuel (HVOF) Spraying to the Fabrication of Yb-Silicate Environmental Barrier Coatings", www.mdpi.com/journal/coatings, Apr. 2017, vol. 7, No. 55, pp. 1-12.
International Search Report for PCT/US2017/062055, dated Aug. 14, 2018.

(Continued)

*Primary Examiner* — Muhammad S Siddiquee
(74) *Attorney, Agent, or Firm* — Lerner, David, Littenberg, Krumholz & Mentlik, LLP

(57) ABSTRACT

A battery includes a case having a feedthrough port, a feedthrough assembly disposed in the feedthrough port, and a cell stack disposed within the case. The feedthrough port includes an inner conductor and an insulator core separating the inner conductor from the case. The cell stack includes an anode, a cathode, and a separator insulating the anode from the cathode, wherein the anode and cathode are offset from one another. An insulating boot surrounding the cell stack insulates the cell stack from the case. The insulating boot has an opening configured to receive therein the feedthrough assembly, which may include overmolded insulation. The interior surfaces and interior walls of the battery case may be thermal spray-coated with a dielectric material to prevent lithium dendrite formation between cathode and anode surfaces.

8 Claims, 30 Drawing Sheets

(56) References Cited

U.S. PATENT DOCUMENTS

| | | | |
|---|---|---|---|
| 2013/0029188 A1* | 1/2013 | Kim | H01M 2/18 |
| | | | 429/53 |
| 2013/0164571 A1 | 6/2013 | Hirose | |
| 2014/0004429 A1 | 1/2014 | Nakanishi | |
| 2014/0072860 A1 | 3/2014 | Inauen | |
| 2014/0272524 A1 | 9/2014 | Visco et al. | |
| 2014/0272544 A1 | 9/2014 | Bruch et al. | |
| 2016/0260963 A1 | 9/2016 | Suzuki | |
| 2016/0293905 A1 | 10/2016 | Bedjaoui et al. | |
| 2017/0214007 A1* | 7/2017 | Geng | H01M 2/0287 |
| 2017/0317331 A1 | 11/2017 | Vedoy | |
| 2017/0324070 A1 | 11/2017 | Toshiro et al. | |
| 2018/0040902 A1 | 2/2018 | Jiang et al. | |

FOREIGN PATENT DOCUMENTS

| | | |
|---|---|---|
| JP | 2005190862 A | 7/2005 |
| WO | 2012154744 A1 | 11/2012 |
| WO | 2014093519 A1 | 6/2014 |
| WO | 2016088506 A1 | 6/2016 |

OTHER PUBLICATIONS

Jiang et al., U.S. Appl. No. 15/649,270, filed Jul. 13, 2017, titled "Electrode Current Collector Design in a Battery."
Partial Search Report and Written Opinion in PCT/US2017/062055, dated Feb. 6, 2018, 12 pages.
Ruzic et al., "Understanding Plasma Spraying Process and Characteristics of DC-ARC Plasma Gun (PJ-100)", Association of Metallurgical Engineers of Serbia, Scientific Paper, Jun. 2012 , Metall. Mater. Eng., vol. 18, No. 4, pp. 273-282.
Shiladitya, "Stiffness of Plasma Sprayed Thermal Barrier Coatings", www.mdpi.com/journal/coatings, May 2017, vol. 7, No. 68, pp. 1-21.

\* cited by examiner

Section 2-2'

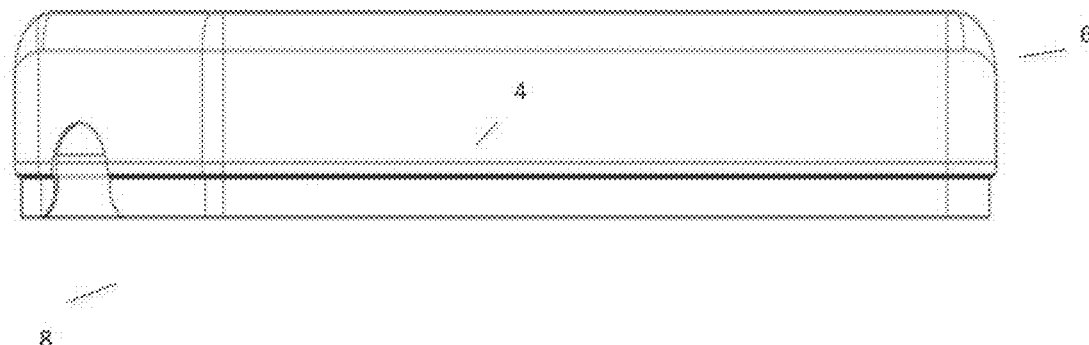
FIG. 21A
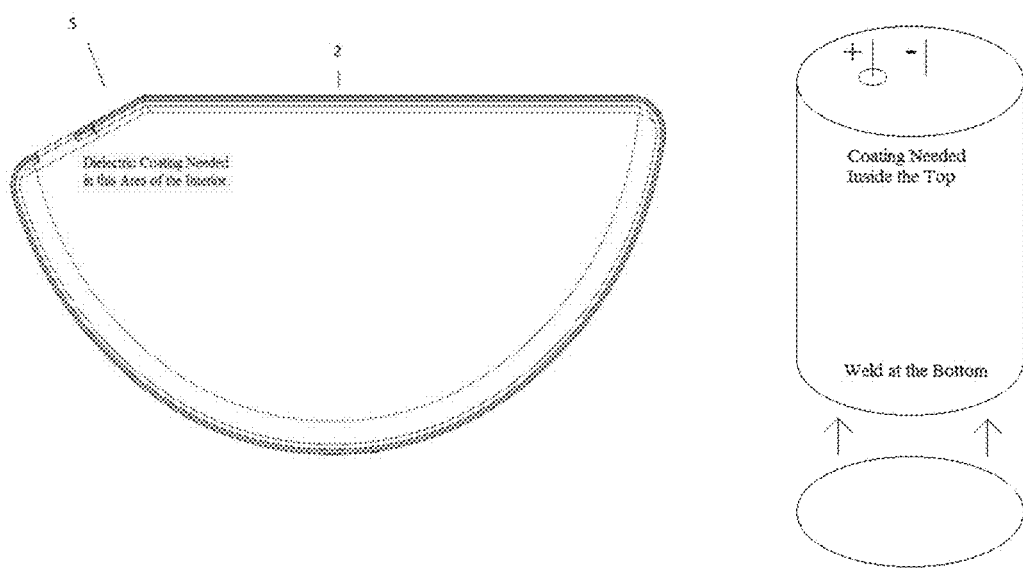
FIG. 21B
FIG. 21C

BATTERY WITH ENHANCED RESISTANCE TO DENDRITE FORMATION

CROSS-REFERENCE TO RELATED APPLICATIONS

The present application is a continuation of U.S. patent application Ser. No. 15/815,217, filed Nov. 16, 2017, which claims priority to U.S. Provisional Application Nos. 62/423,081, filed Nov. 16, 2016, entitled, "Battery Having a Dielectric Material Coating," 62/448,843, filed Jan. 20, 2017, entitled "Battery With Enhanced Resistance to Dendrite Formation," and U.S. Provisional Application No. 62/553,551, filed Sep. 1, 2017, entitled "Battery With Enhanced Resistance to Dendrite Formation," the disclosures of which are hereby incorporated herein by reference in their entireties.

FIELD OF THE INVENTION

The present disclosure relates generally to batteries, and more particularly, to batteries having enhanced resistance to dendrite formation.

BACKGROUND OF THE INVENTION

Batteries used in Implantable Medical Devices (IMDs), such as cardiac pacemakers and Implantable Cardioverter Defibrillators (ICDs), are required to meet high quality and performance specifications and reliability. They need to have high energy density, high rate capability and long shelf life. Since replacement of the battery of an IMD means that the patient must undergo surgery, batteries for IMDs must have a long service life. Improvement to the reliability, performance, and lifetime of such batteries is highly desirable.

ICDs treat ventricular fibrillation, also known as sudden cardiac death. Ventricular fibrillation is characterized by rapid, erratic contraction of the heart resulting in little or no pumping of blood and is generally a fatal condition. An ICD delivers a high-energy pulse (typically up to 35 J) to the heart within seconds of detecting ventricular fibrillation. Minimizing the time a patient remains in fibrillation is an important goal of this therapy. To deliver this life-saving therapy, the ICD battery charges a capacitor to a desired energy level in as short a time as possible, and the capacitor is subsequently discharged through the heart. Because prompt therapy is desirable, the capacitor charge-time, typically in the range of 5 to 15 seconds, is a measure of device performance.

Silver Vanadium Oxide (SVO) batteries are commonly used in medical devices, because they provide a very high energy output rate required by ICDs. The battery consists of multiple cathode (SVO) layers and corresponding anode (lithium metal) layers.

Lithium dendrite formation and resulting internal shorting is one of the major failure modes for ICD batteries. Dendrite formation can result in a short circuit when a bridge is made between an anodic surface and a cathodic surface. Lithium dendrite formation mechanisms are not well controlled through chemistry or geometry changes. Insulation of the active elements in the battery is currently the only method available to mitigate early battery depletion due to a short from lithium dendrite formation. But existing insulation structures have shortcomings.

Insulation joints used in the industry consist of either a simple overlapping fit between insulating parts or an interference joint as described in U.S. Pat. No. 9,281,507. These types of joints exhibit fit variations that result from component tolerances and manufacturing variations, and can leave openings for dendrites to form, allowing for a shorting failure to occur. What is needed is a battery construction that is more resistant to the formation of lithium dendrites in undesirable places.

BRIEF SUMMARY OF THE INVENTION

Some embodiments of the present disclosure provide a battery and an electrical insulation scheme for same. The insulation scheme creates a robust shield that is impenetrable to the electrolyte and will prevent the formation of lithium dendrites in undesirable places.

Some embodiments of the present disclosure provide an anode-cathode alignment in key areas of the battery to reduce lithium dendrite formation. The reduction of lithium dendrites is achieved by ensuring the lithium anode is recessed from the cathode edge around critical areas for lithium dendrite formation. The critical areas include regions where the cathode tabs exit the stack and the 'header' of the cell where the feedthrough assembly exits the battery case.

Some embodiments of the present disclosure are directed to a battery comprising a case having a feedthrough port, a feedthrough assembly disposed in the feedthrough port and including an inner conductor and an insulator core separating the inner conductor from the case, and a cell stack disposed within the case. The cell stack includes an anode having an anode tab, a first peripheral portion adjacent the anode tab, and a second peripheral portion distal from the anode tab. The cell stack further includes a cathode having a cathode tab, a first peripheral portion adjacent the cathode tab, a second peripheral portion distal from the cathode tab. The cell stack additionally includes one or more separator layers electrically insulating the anode from the cathode, wherein the anode, the cathode and the one or more separator layers are stacked together and the anode is offset from the cathode such that the second peripheral portion of the anode is recessed from the first peripheral portion of the cathode by a first offset distance, and the first peripheral portion of the anode extends outward from the second peripheral portion of the cathode by a second offset distance.

In some embodiments, the first offset distance may be between 0.001 inches and 0.03 inches. In some embodiments, the first offset distance may be between 0.01 inches and 0.02 inches. In some embodiments, the first and second offset values are the same (i.e., substantially equal to one another).

In some embodiments, the feedthrough assembly further comprises a ferrule and feedthrough insulation, wherein the ferrule couples to the feedthrough port, the insulator core and the inner conductor are disposed within a lumen of the ferrule, and the feedthrough insulation is disposed circumferentially around a portion of the ferrule that extends into the case.

In some embodiments, the battery further comprises an insulating boot surrounding the cell stack to electrically insulate the cell stack from the case, the insulating boot having an opening configured to receive therein the feedthrough insulation, wherein the insulating boot is sealed to the feedthrough insulation.

In some embodiments, the insulating boot includes a lip around the opening that overlaps at least a part of the feedthrough insulation and is sealed to the feedthrough insulation.

In some embodiments, the feedthrough insulation is fully inserted into the opening of the insulating boot to mate with an inner surface of the lip of the insulating boot, and the lip of the insulating boot is sealed to the feedthrough insulation.

In some embodiments, the insulating boot is sealed to the feedthrough insulation of the feedthrough assembly by a heat-seal, a compression joint, an adhesive, or a combination thereof, to form a liquid-tight seal. In some embodiments, the insulating boot is heat-sealed to the feedthrough insulation of the feedthrough assembly by a laser-weld, an RF weld, a resistance weld, a friction weld, or combinations thereof.

In some embodiments, the insulating boot is made of a material selected from the group consisting of polyethylene (PE), ethylenetetrafluoroethylene (ETFE), polyether ether ketone (PEEK), polypropylene (PP), and mixtures thereof.

In some embodiments, the material of the insulating boot has an average pore diameter of up to 0.05 μm.

In some embodiments, the anode tab is electrically connected to the case, and the cathode tab is electrically connected to the inner conductor of the feedthrough assembly, the inner conductor of the feedthrough assembly being the only cathodic surface disposed in the feedthrough assembly.

In some embodiments, the cathode tab is free of cathode active material.

In some embodiments, the feedthrough insulation is made of a material selected from the group consisting of polyethylene (PE), ethylenetetrafluoroethylene (ETFE), polyether ether ketone (PEEK), polypropylene (PP), polyurethane (PU), silicones, polycarbonate (PC), and mixtures thereof.

In some embodiments, the cathode includes a cathode active material and the battery further comprises an electrolyte, wherein a weight ratio of the electrolyte to the cathode active material is between 0.25 and 0.4. In some embodiments, the battery is a prismatic cell having a volume of between 3 cc and 10 cc.

Some embodiments of the present disclosure are directed to a battery comprising a case having a feedthrough port, a feedthrough assembly disposed in the feedthrough port and including a ferrule, an inner conductor disposed within a lumen of the ferrule, and an insulator core disposed within the lumen of the ferrule and separating the inner conductor from the ferrule, and feedthrough insulation circumferentially disposed on the ferrule. A cell stack is disposed within the case and includes an anode having an anode tab, a cathode having a cathode tab, and one or more separator layers electrically insulating the anode from the cathode. An insulating boot surrounds the cell stack to electrically insulate the cell stack from the case, the insulating boot having an opening configured to receive therein the feedthrough insulation, the insulating boot being sealed to the feedthrough insulation.

In some embodiments, the insulating boot comprises a nano-porous material having an average pore diameter of up to 0.05 μm.

In some embodiments, the inner conductor of the feedthrough assembly is the only cathodic surface disposed in the feedthrough assembly.

In some embodiments, the cathode includes a cathode active material comprising silver vanadium oxide (SVO) or a mixture of SVO and carbon monofluoride (CFx).

In some embodiments of the present disclosure, thermal spray coating is used to electrically insulate the interior surfaces and interior walls of the battery with dielectric material in order to prevent lithium dendrite formation between cathode and anode surfaces. The dielectric material may comprise ceramic oxides, such as aluminum, titanium, and/or other similar ceramic oxides. In certain embodiments, only the interior surfaces and interior walls of the battery case are coated with a dielectric material, and the exterior surfaces of the battery remain free from dielectric material. The battery case may be laser welded to a lid to create an enclosure. The dielectric coating advantageously survives the welding process unharmed, does not interfere with the laser weld (so that the weld provides a good seal), and performs well in a harsh environment, i.e., does not significantly degrade when exposed to battery electrolytes.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIG. 21A-C depict various elements of a battery housing according to embodiments of the disclosure.

DETAILED DESCRIPTION

Figure 1:
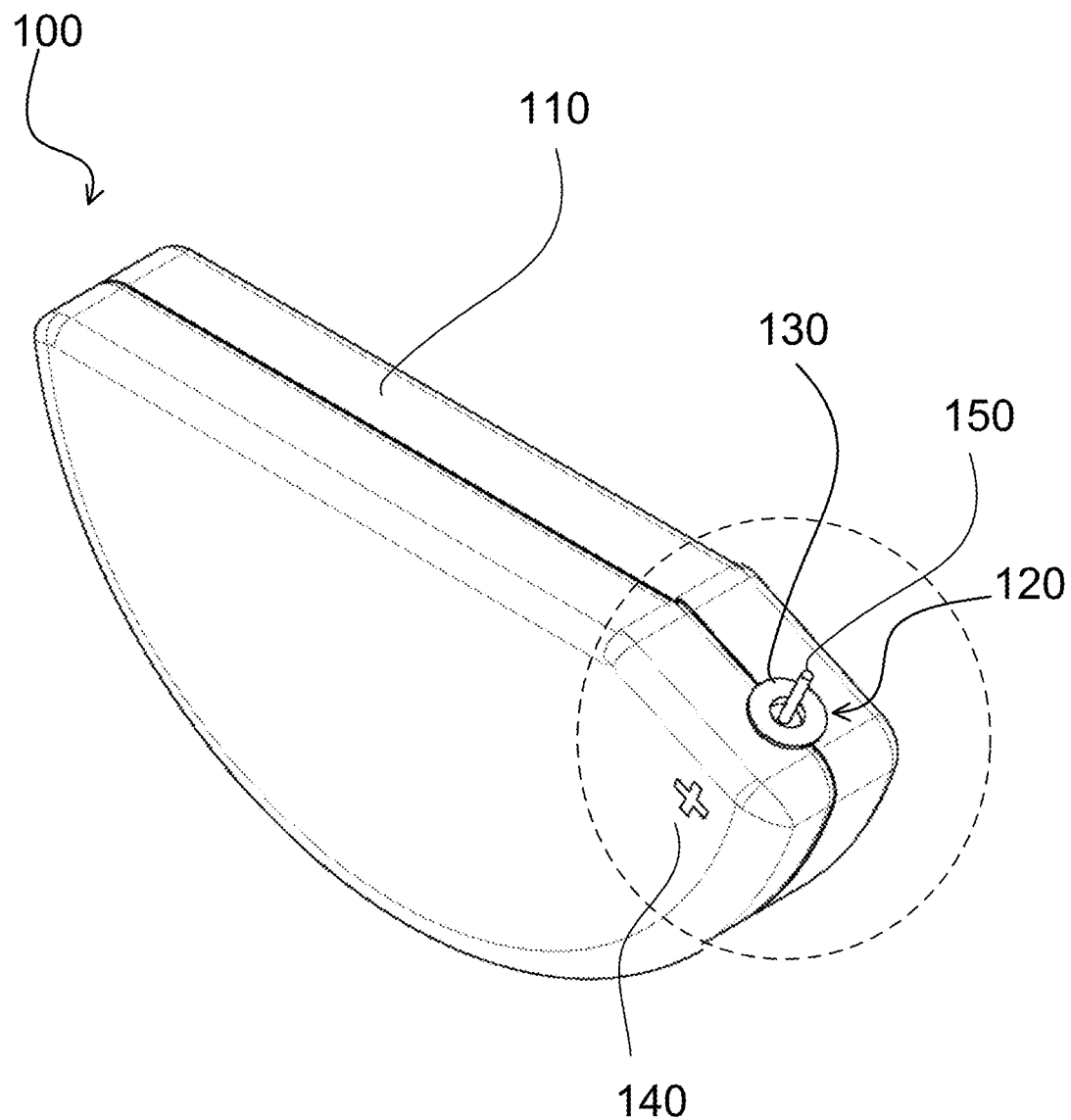
FIG. 1 shows a perspective view of a battery, according to an embodiment.

The following detailed description refers to the accompanying drawings that illustrate exemplary embodiments. Other embodiments are possible, and modifications may be made to the disclosed embodiments within the spirit and scope of the invention. Therefore, the following detailed description is not meant to limit the invention. Rather, the scope of the invention is defined by the appended claims.

The present disclosure generally relates to mitigation of lithium dendrite or lithium cluster formation in Silver Vanadium Oxide (SVO) batteries.

Based on the standard battery design rules, when stacked, the lithium metal extends past the cathode edge to ensure the entire cathode participates in the high current pulse. Test data shows that lithium dendrites can form on anodic surfaces that do not have a cathodic surface close by.

Current ICD battery insulation schemes are focused on preventing what could otherwise result from physical contact between anode and cathode surfaces due to battery swelling, manufacturing variations, or mechanical disturbances such as vibration. These insulation schemes do not sufficiently protect the cell from dendrite formations growing around the insulators and creating shorts, as observed experimentally in multiple instances.

In some embodiments, a robust insulation scheme prevents a direct path for the electrolyte to wet between a nonactive anodic surface and cathodic surfaces. The insulation scheme includes a combination of overmolded feedthrough insulation and insulating boots (i.e., covers or sleeves). The insulation scheme creates a robust shield that is impenetrable to the electrolyte and stops the formation of lithium dendrites in undesirable places. In some embodiments, one or two insulating boots and an overmolded feedthrough are bonded together to form a continuous and impenetrable insulator around the critical areas. A fully bonded joint is not susceptible to lithium dendrite infiltration and is more robust during manufacturing handling.

In some embodiments, a method of fabricating SVO/Lithium metal batteries that reduces the occurrence of lithium dendrites is discussed. A reduction of lithium dendrites is achieved by ensuring that the lithium anode is recessed from the cathode edge around critical areas of lithium dendrite formation. Critical areas include where the cathode tabs exit the stack, the 'header' of the battery where the feedthrough exits the battery case, and any location that contains cathodic surfaces that are not coated with cathode materials.

The battery described herein is sometimes referred to as a "lithium metal battery," an "SVO/lithium metal battery," "SVO battery," a "lithium battery," an "electrochemical cell," or some combination of these terms. The battery comprises a case enclosing the electrode assembly, an electrolyte, a feedthrough assembly, and the insulating structure.

The feedthrough assembly, which may also be referred to as a "feed thru," "feedthrough," or "feed through" (sometimes hyphenated) assembly, is commonly used to pass an electrode through a case in which an anode-cathode stack is held.

Battery Structure Overview

FIG. 1 illustrates a perspective view of a battery 100. In some embodiments, battery 100 includes a case 110 having a feedthrough port 120. A feedthrough assembly 130 is disposed in feedthrough port 120. As shown in FIG. 1, a "plus" sign, denoted by "+", on case 110 indicates that an anode of battery 100 is electrically connected to case 110, making case 110 an anode terminal 140 of battery 100. The plus sign may be engraved, painted, inscribed, or printed on the outer surface of case 110. In some embodiments, according to the disclosure, a cathode pin 150 extends outwardly from case 110 of battery 100 in a manner such that an external load such as an ICD may be electrically connected. Cathode pin 150 may also be referred to as a "cathode lead" or a "cathode post" or "cathode terminal" and comprises an electrical conductor such as a wire, a fiber, a pin or other suitable structure.

In some embodiments, case 110 is a stainless steel clamshell style case. Case 110 may be made from other suitable materials, for example, aluminum, titanium, nickel alloys, or other biocompatible materials.

Although not shown in FIG. 1, an electrolyte would also exist in battery 100 to facilitate ion transport between the anodic and cathodic regions. The electrolyte may be a polymer or a liquid electrolyte as would be understood to one skilled in the art. Examples of the electrolyte systems include lithium bis-trifluoromethanesulfonimide (LiTFSI) in propylene carbonate/dimethoxyethane, lithium hexafluoroarsenate (LiAsF6) in propylene carbonate/dimethoxyethane, lithium hexafluorophosphate (LiPF6) in propylene carbonate/dimethoxyethane, or lithium bis(fluorosulfonyl)imide (LiFSI) in propylene carbonate/dimethoxyethane. Other suitable electrolyte systems may be used.

In some embodiments, the solvents used in the electrolyte may be selected from a group consisting of propylene carbonate (PC), dimethoxyethane (DME), ethylmethyl carbonate (EMC), dimethyl carbonate (DMC), or diethyl carbonate (DEC). Other suitable solvents may be used in combination with the electrolyte salts.

In some embodiments, some additives may be added to the electrolyte in combination with the solvents. The additives may be selected from a group consisting of diphenol carbonate (DPC) or dibutyl carbonate (DBC). Other suitable additives may be used.

In some embodiments, the electrolyte comprises lithium hexafluoroarsenate (LiAsF6) in propylene carbonate/dimethoxyethane, and dibutyl carbonate (DBC). The ratios of each component of the electrolyte may be suitably adjusted to achieve desired results.

In some embodiments, the active cathode material of battery 100 comprises a mixture containing 94% SVO, 2% carbon, 1% graphite, and 3% poly-tetrafluoroethylene (PTFE) by weight.

In some embodiments, battery 100 is based on a prismatic stacked cell design capable of 4.4 A (amperes) of current and 2200-2500 mAhr of theoretical capacity. In an exemplary embodiment, battery 100 is a prismatic cell having a volume in the range of 3 cc to 10 cc.

In some embodiments, battery 100 further comprises an electrolyte, wherein a weight ratio of the electrolyte to the active cathode material has a value in the range of 0.25 to 0.4.

Figure 2A:
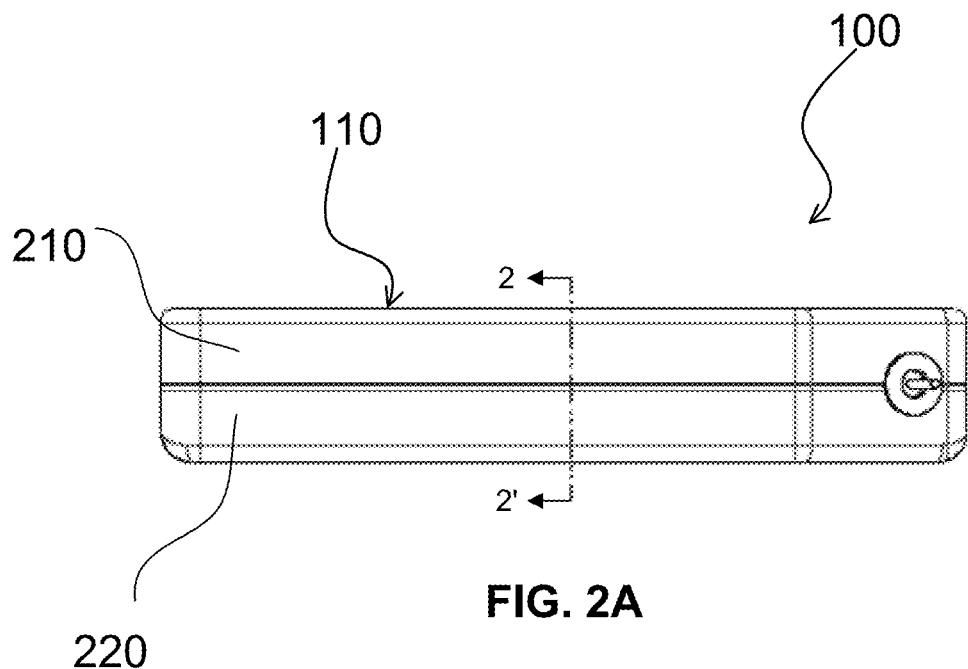
FIG. 2A shows an edge view of a battery, according to an embodiment.
Figure 2B:
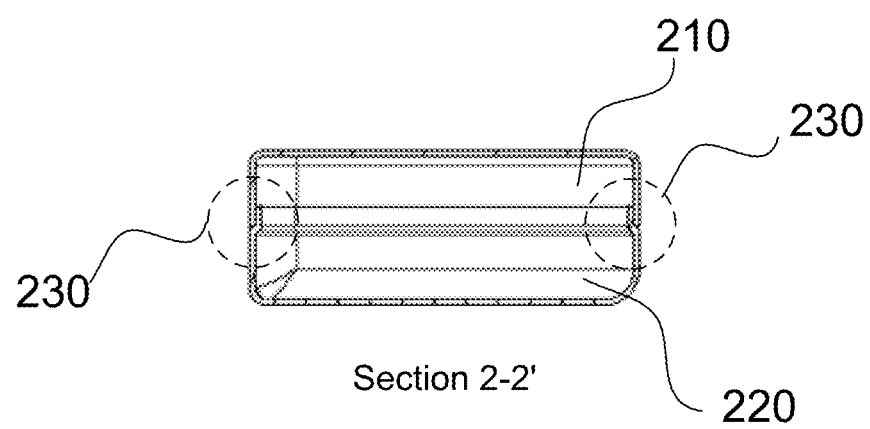
FIG. 2B shows a transverse cross-section taken along line 2-2' of FIG. 2A.

FIGS. 2A and 2B illustrate edge views of battery 100. FIG. 2A shows an edge view including feedthrough assembly 130. In some embodiments, as shown in FIG. 2A, case 110 further includes a lid 210 and a base 220. FIG. 2B shows a sectional view of battery 100 taken along line 2-2' shown in FIG. 2A. As illustrated, in a closed configuration of case 110, lid 210 and base 220 mate in an overlapping manner to form a hermetic seal 230 around the periphery of case 110. Hermetic seal 230 provides a continuous and impermeable barrier between the components of the battery 100 enclosed by case 110 and the external environment. Hermetic seal 230 also prevents the electrolyte from leaking out of case 110 and eliminates infiltration of any external fluids into battery 100.

In some embodiments, case 110 may include a hinge (not shown) joining lid 210 and base 220. In a closed configuration, the hermetic seal between lid 210 and base 220 may be obtained by heat-sealing, compression-joints, snap-fit, friction-fit, pressure-sensitive tapes, adhesives, welding, soldering, brazing, or any other suitable method.

Figure 3A:
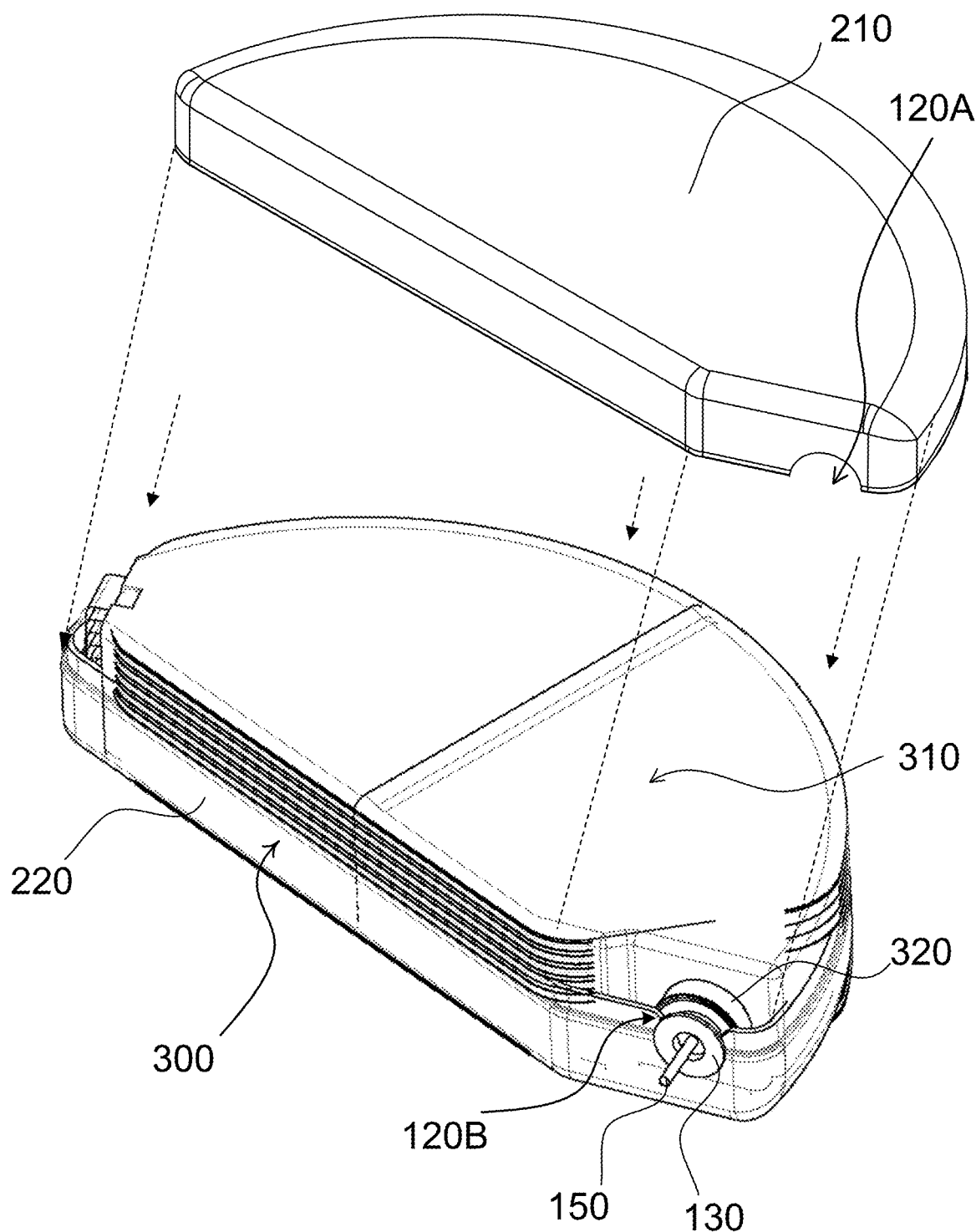
FIG. 3A is an exploded view showing a lid 210 removed from a case 110 to illustrate a cell stack 300 inside of case 110, according to an embodiment.

FIG. 3A is an exploded view showing lid 210 removed from case 110 to illustrate a cell stack 300 inside of case 110. Lid 210 includes an opening 120A which forms a first portion of feedthrough port 120. Base 220 includes an opening 120B (shown in FIG. 3B) which forms a second portion of feedthrough port 120. Openings 120A and 120B align to form feedthrough port 120 when lid 210 is jointed to base 220. A cell stack 300 is disposed within the case 110.

Insulating Boot/Feedthrough Assembly

The first insulating scheme provides insulation to prevent short circuiting between an anode terminal 330 (shown in FIG. 3B) (which is electrically connected to case 110) and a cathode terminal or pin 150. Cell stack 300 is encased in an insulating boot 310 disposed in case 110. Insulating boot 310 is configured to physically and electrically insulate cell stack 300 from case 110. Insulating boot 310 comprises a feedthrough opening 320 aligned coaxially with the feedthrough port 120, and configured to receive feedthrough assembly 130 therethrough. In some embodiments, insulating boot 310 with the feedthrough opening 320 may be formed by vacuum forming, injection molding, press-molding, or other suitable methods including a combination of known methods. Alternatively, feedthrough opening 320 may be created after insulating boot 310 is formed. Example methods of forming feedthrough opening 320 include punching, drilling, cutting, and etching through insulating boot 310.

In some embodiments, insulating boot 310 may be made from an electrically insulating material that is compatible with the electrochemical system and can be thermally or mechanically bonded to the feedthrough assembly 130. The insulating boot 310 may be made, for example, from vacuum formed plastic, polypropylene (PP), polyethylene (PE), polycarbonate (PC), ethylenetetrafluoroethylene (ETFE), Surlyn®, polyether ether ketone (PEEK), mixtures of the foregoing, or other suitable materials. In an example embodiment, the preferred materials of choice are polyethylene (PE) and ethylenetetrafluoroethylene (ETFE). Insulating boot 310 may also be made from the same electrically insulating material or materials used to form the anode and/or cathode separators, as will be described further below.

Figure 3B:
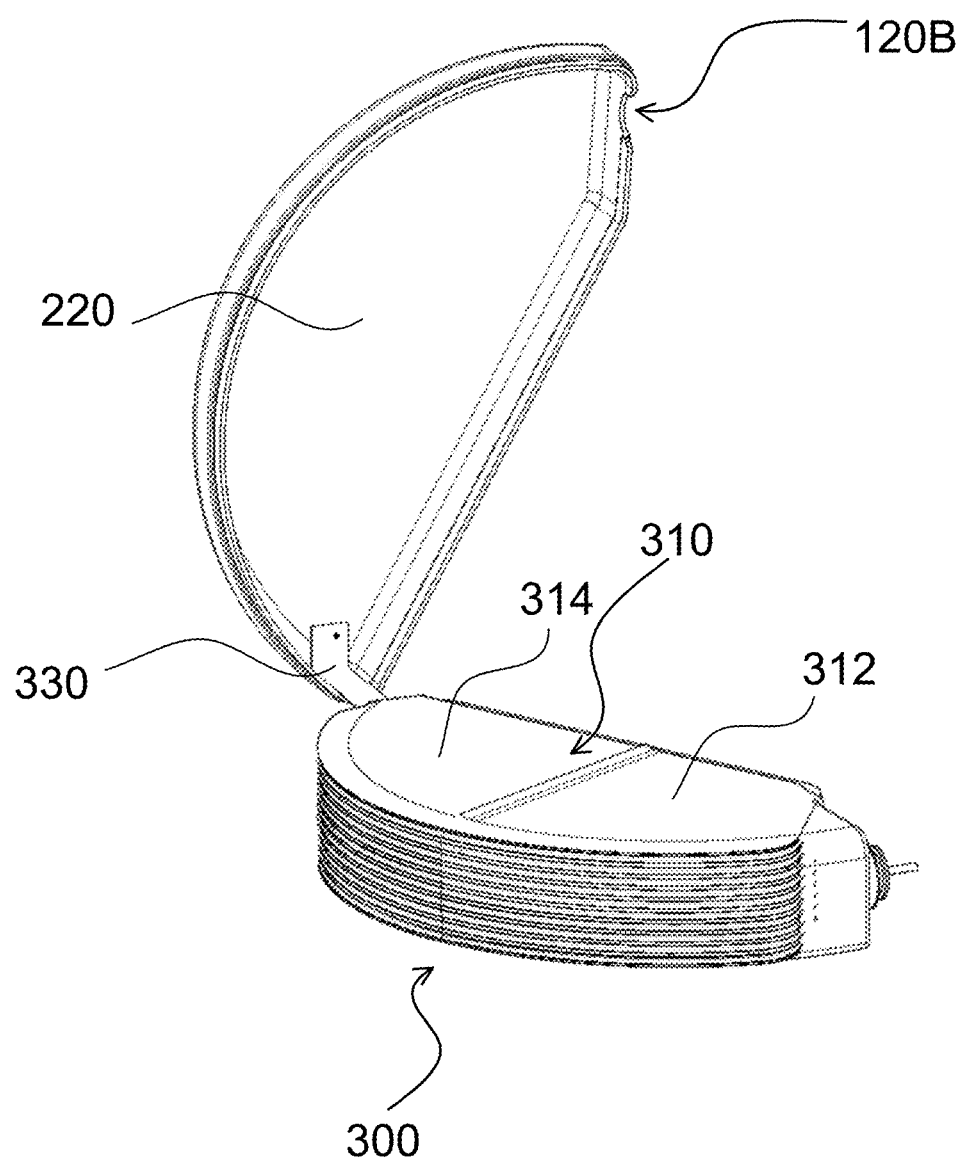
FIG. 3B is a perspective view of a cell stack 300 connected to a base 220 of case 110 of a battery, according to an embodiment.

FIG. 3B is a perspective view of cell stack 300 connected to base 220 of case 110, according to an embodiment. FIG. 3B shows insulating boot 310 surrounding cell stack 300. The cell stack 300 comprises at least an anode having an anode tab 330. (The details of elements of cell stack 300 are discussed in detail in later sections of this disclosure.) Anode tab 330 electrically connects the anode (or anodes) in cell stack 300 to base 220, which forms the positive or anode terminal 140 of battery 100. Anode tab 330 is an electrical conductor made of a suitable metal which is spot-welded or otherwise suitably joined to an inner surface of base 220. In some embodiments, anode tab 330 may alternatively or additionally be directly connected to lid 210 of case 110.

Figure 3C:
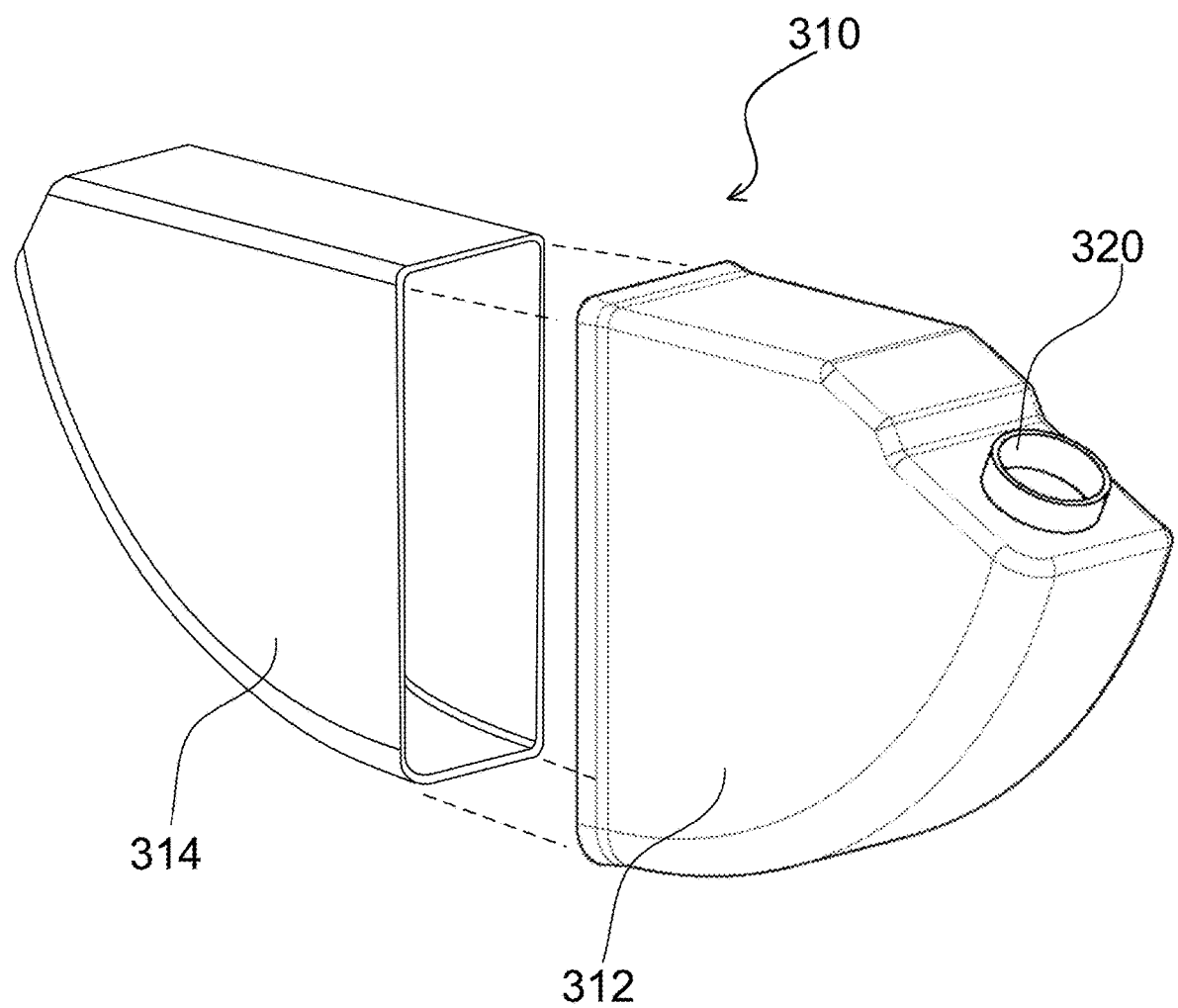
FIG. 3C is a perspective view of an insulating boot 310, according to an embodiment.

In some embodiments, insulating boot 310 comprises a front portion 312 and a tail portion 314. As shown in FIG. 3C, the "front" portion refers to the portion (e.g., approximately half) of insulating boot 310 that includes feedthrough opening 320. The "tail" portion refers to the remaining portion (e.g., half) of insulating boot 310. Similarly, the portion of battery 100 where feedthrough port 120 is disposed may be referred to as the "front" end or "header" of battery 100. The remaining portion of battery 100 may be referred to as the "tail" end of battery 100.

Front portion 312 and tail portion 314 of insulating boot 310 may be overlapped and sealed to encase and insulate cell stack 300 from the case 110. Sealing may include bonding thermally, mechanically, using adhesives or using other suitable means.

In some alternate embodiments, not illustrated in the figures, insulating boot 310 may be split along a perpendicular axis to form a top half and a bottom half, rather than a front portion and a tail portion. In some embodiments, either front portion 312, or tail portion 314, or both may further be split along a perpendicular axis to form a top half and a bottom half. The top halves and the bottom halves may be bonded together thermally, mechanically, using adhesives or using other suitable means.

Figure 4A:
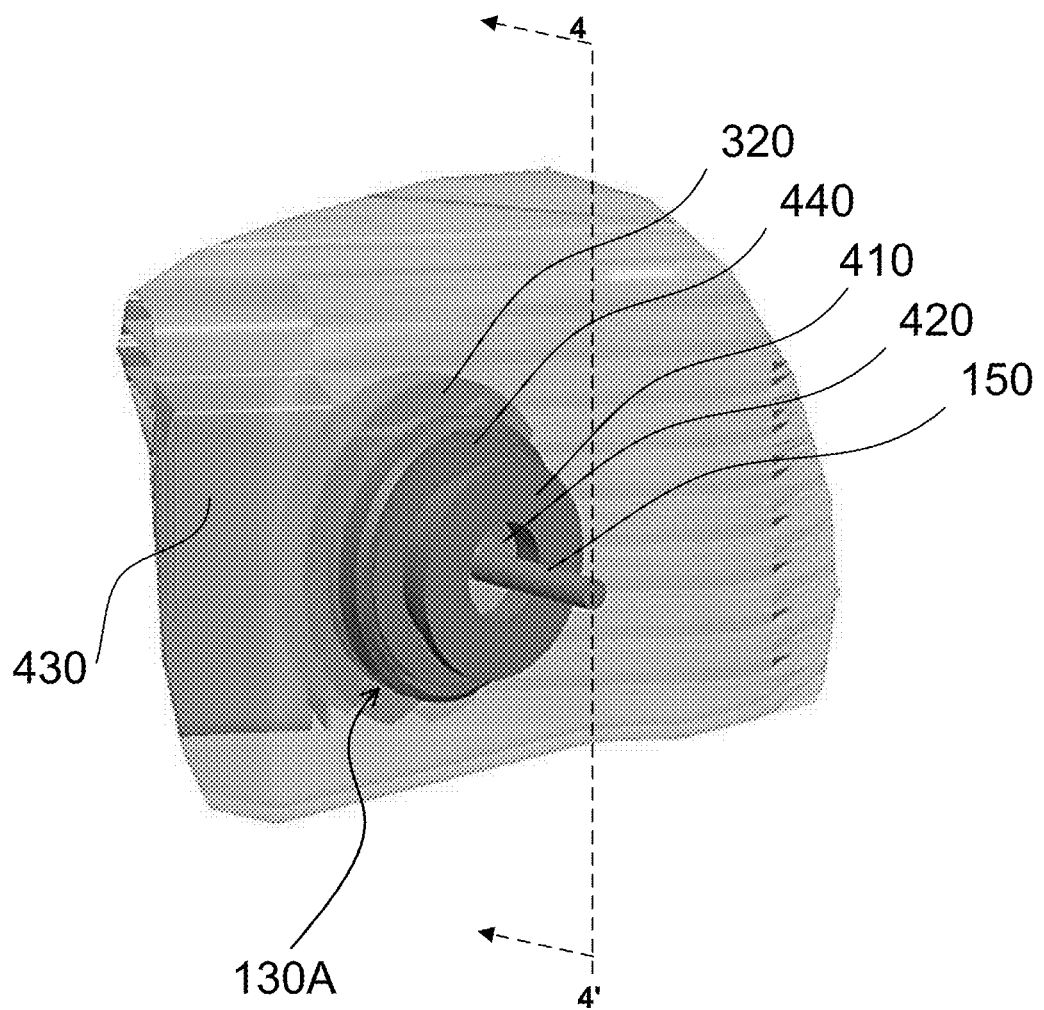
FIG. 4A is a partial, cutaway, perspective view showing a feedthrough assembly 130A connected to a cathode tab 430 of cell stack 300 of a battery, according to an embodiment.
Figure 4B:
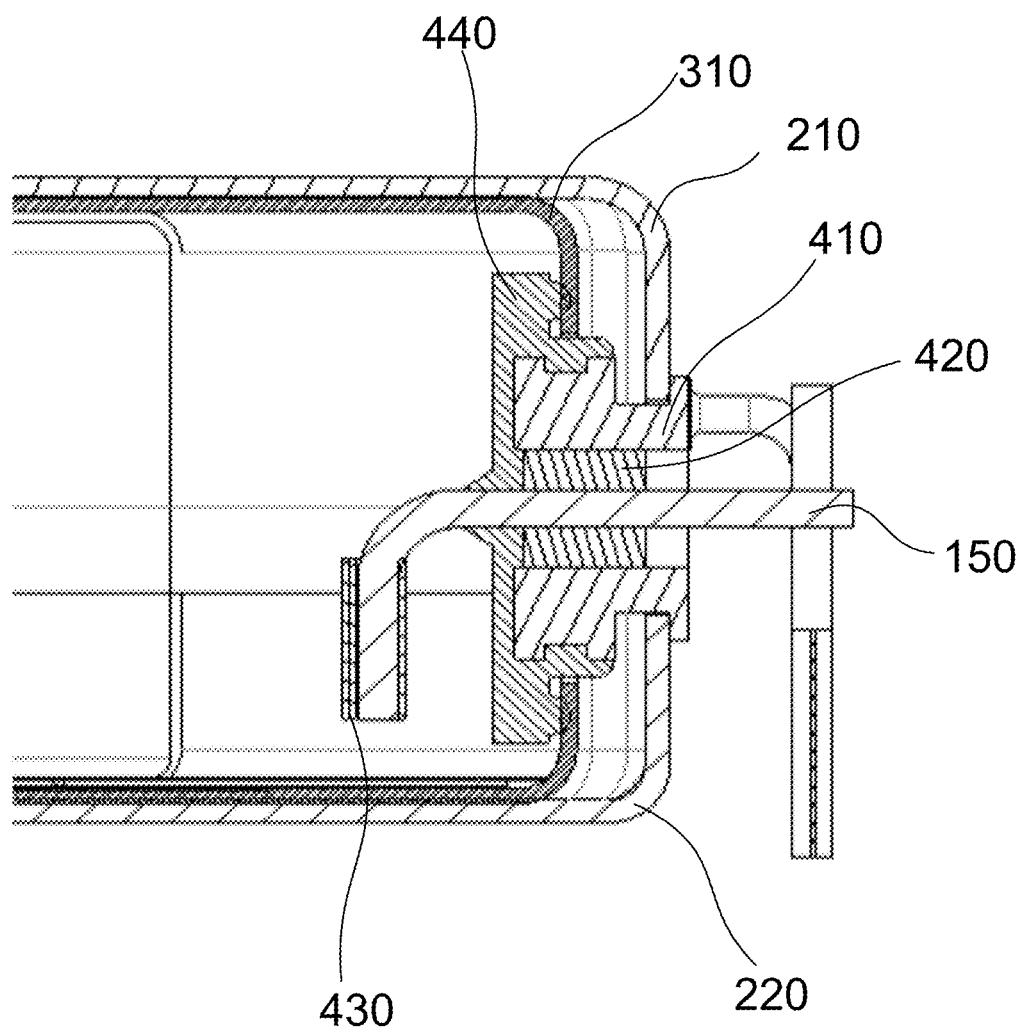
FIG. 4B is a cross-sectional view taken along line 4-4' of FIG. 4A.

FIG. 4A is a partial, cutaway, perspective view showing a feedthrough assembly 130A connected to a cathode tab 430 of cell stack 300 of battery 100, according to an embodiment. FIG. 4B is a cross-sectional view taken along line 4-4' shown in FIG. 4A. In some embodiments, feedthrough assembly 130A is a glass-to-metal-seal feedthrough in which an insulating core 420 made of glass is surrounded by a metal ferrule 410. Cathode pin 150 is electrically connected to cathode tab 430 inside of case 110. The other end of cathode pin 150 extends outward from case 110 for connection to an external load on battery 110. Metal ferrule 410 is at least partially surrounded by an insulating material, referred to as feedthrough insulation 440. Feedthrough insulation 440 may be applied to ferrule 410 by an overmolding process. As used herein, feedthrough insulation 440 applied by overmolding may be referred to as an "overmolded feedthrough." Base 220 and lid 210 of case 110 form a tight seal against metal ferrule 410 at feedthrough opening 320.

In some embodiments, the feedthrough insulation 440 comprises an electrically insulating material such as a plastic including, for example, polypropylene (PP), polyethylene (PE), polycarbonate (PC), ethylenetetrafluoroethylene (ETFE), Surlyn®, polyether ether ketone (PEEK), silicones, polyurethane (PU), mixtures of the foregoing, or other suitable materials. The feedthrough insulation 440 may be formed, for example, by over-molding, gluing with a suitable adhesive, heat-sealing, compression-joints, or other suitable means.

In some embodiments, feedthrough opening 320 in front portion 312 of insulating boot 310 and overmolded feedthrough insulation 440 of feedthrough assembly 130 are bonded together to form a continuous liquid-tight seal. The liquid-tight seal is intended to prevent lithium cluster or lithium dendrite infiltration between cathode pin 150 and adjacent anodic structures, such as metal ferrule 410, adjacent portions of the anodes, and adjacent areas of case 110.

In some embodiments, a bonded and sealed joint may be formed by heat-sealing, compression-joints, suitable adhesives, a combination of the foregoing, or other suitable methods. More specifically, the heat-sealed joints may be formed by laser welding, resistive welding, friction welding, radio-frequency (RF) welding, or a combination thereof. In some embodiments, feedthrough insulation 440 and insulating boot 310 are compression-sealed through mechanical interference.

Figure 5:
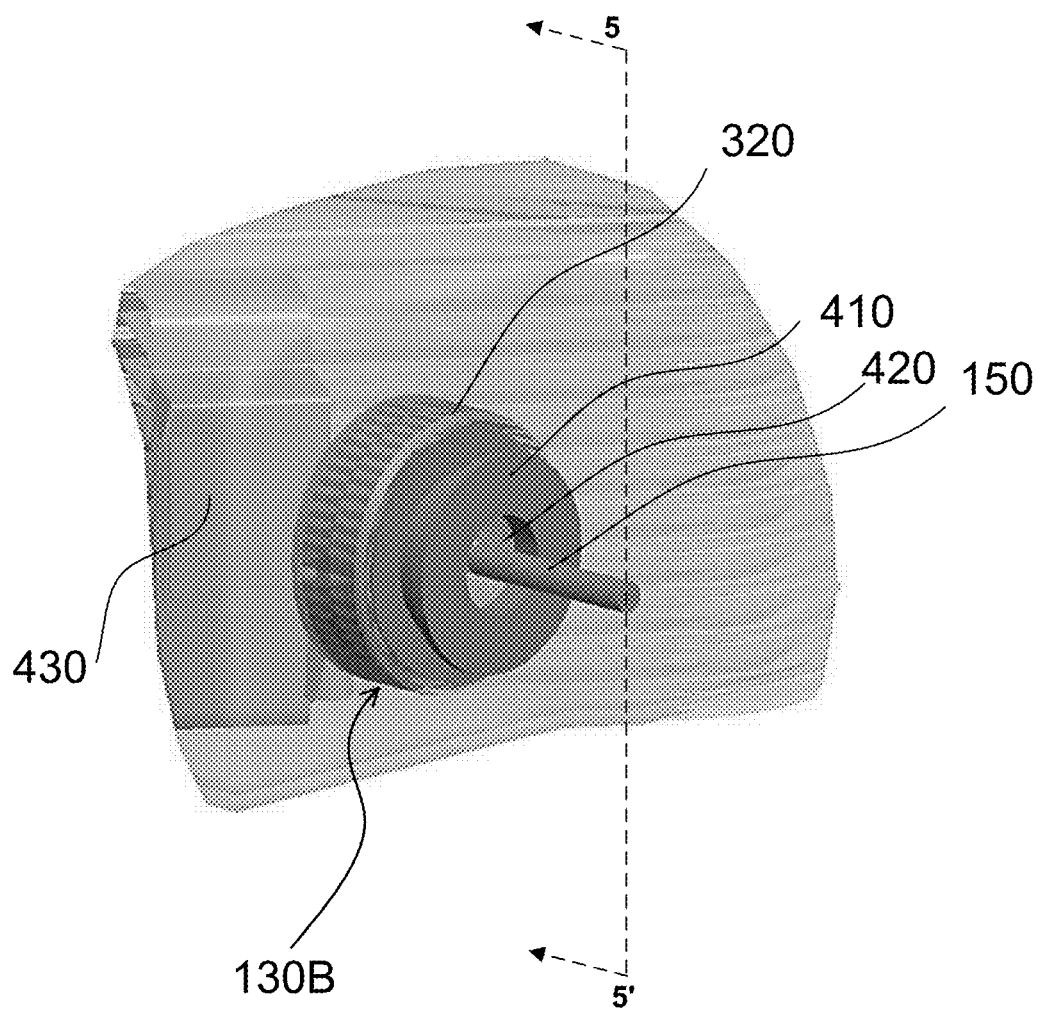
FIG. 5 is a partial, cutaway, perspective view showing a feedthrough assembly 130B connected to a cathode tab 430 of cell stack 300 of a battery, according to another embodiment.
Figure 6:
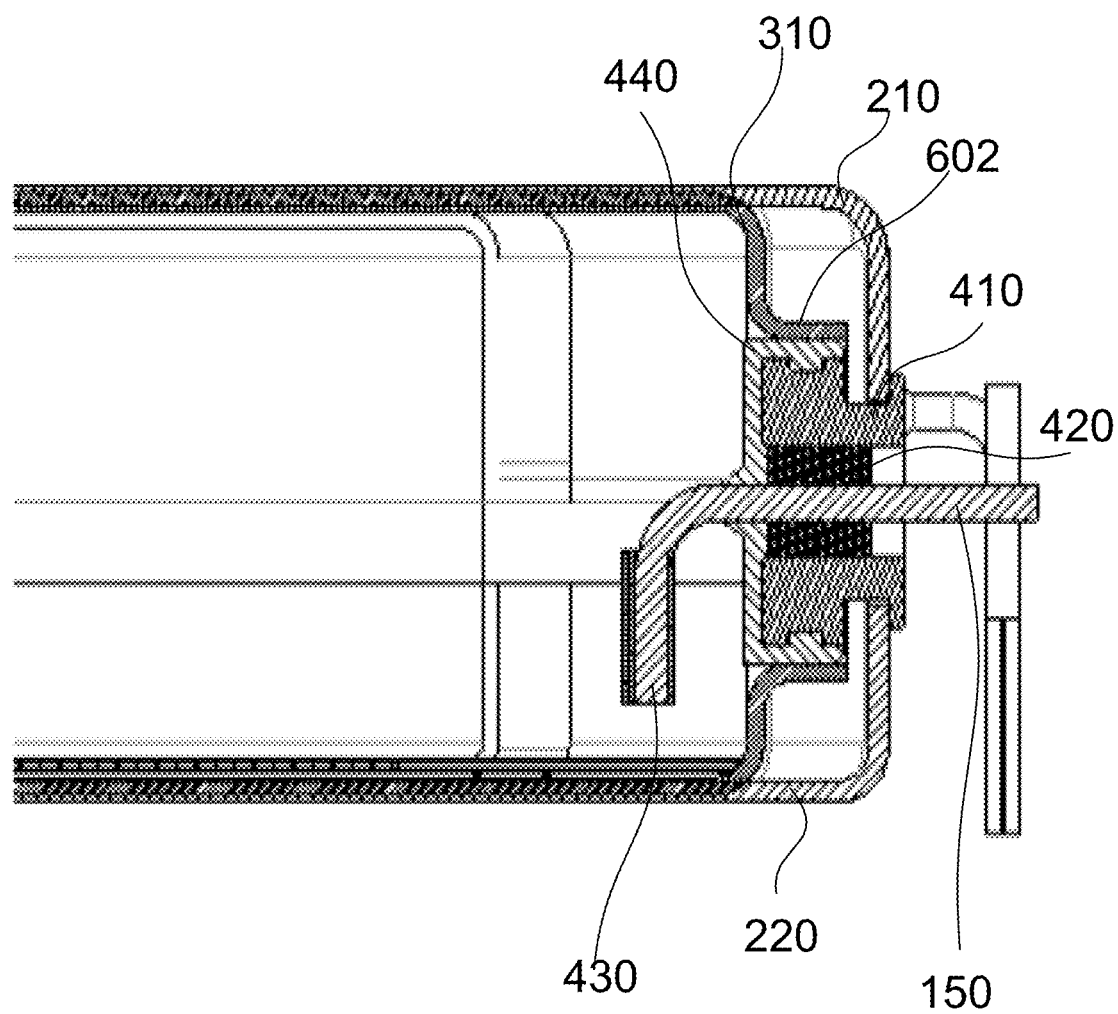
FIG. 6 is a cross-sectional view taken along line 5-5' of FIG. 5.

FIG. 5 is a partial, cutaway, perspective view showing a feedthrough assembly 130B connected to cathode tab 430 of cell stack 300 of a battery, according to another embodiment. The connection between feedthrough assembly 130B and cathode tab 430 can be rigid or flexible. FIG. 6 is a cross-sectional view taken along line 5-5' of FIG. 5. As shown in FIGS. 5 and 6, insulating boot 310 includes a lip 602 that extends over and surrounds feedthrough insulation 440. In certain embodiments, lip 602 overlaps feedthrough insulation 440 by at least 3 times the thickness of the material forming insulating boot 310. In other embodiments, the overlap is between 10 times and 15 times the thickness of the material forming insulating boot 310. In contrast, in the embodiment shown in FIGS. 4A and 4B, insulating boot 310 does not include lip 602. The embodiment shown of FIGS. 5 and 6 may be preferable for ease of assembly.

In some embodiments, the portion of feedthrough insulation 440 that is exposed after insulating boot 310 is coupled to it (e.g., via bonding) may be, for example, in the range of about 10% to about 90% of the total surface area of feedthrough insulation 440.

Anode/Cathode Assembly

Figure 7A:
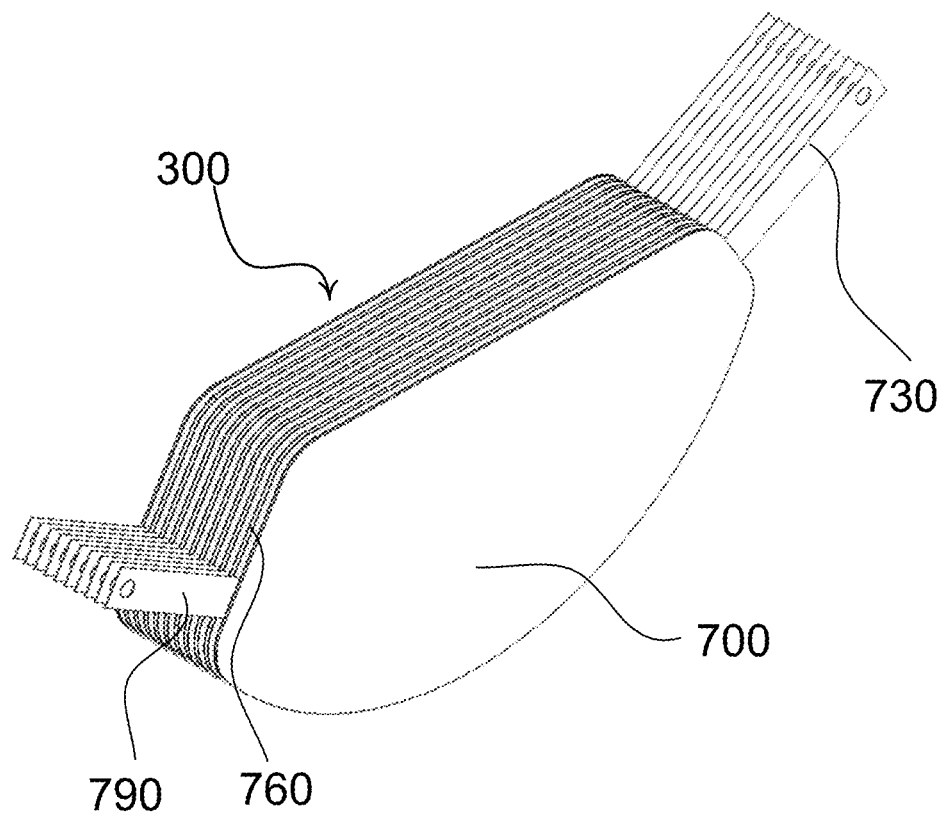
FIG. 7A is a perspective view of the cell stack, according to an embodiment.
Figure 7B:
FIG. 7B shows an edge view of the cell stack, according to an embodiment.

FIG. 7A is a perspective view of the cell stack, according to an embodiment, and FIG. 7B shows an edge view of the same cell stack. Cell stack 300 may comprise a plurality of anodes 700 and a plurality of cathodes 760 stacked in an alternating manner with a separator 750 electrically insulating each of the anodes 700 from each of the cathodes 760. Each of anodes 700 comprises an anode current collector tab 730, and each of cathodes 760 comprises a cathode current collector tab 790. Each of the components of the cell stack will be described in detail in the following sections.

In some embodiments, separator 750 comprises a microporous or a nano-porous material with an average pore size in the range of 0.02 μm to 0.5 μm. In an exemplary embodiment, the average pore size of separator 750 is 0.05 μm.

Figure 8:
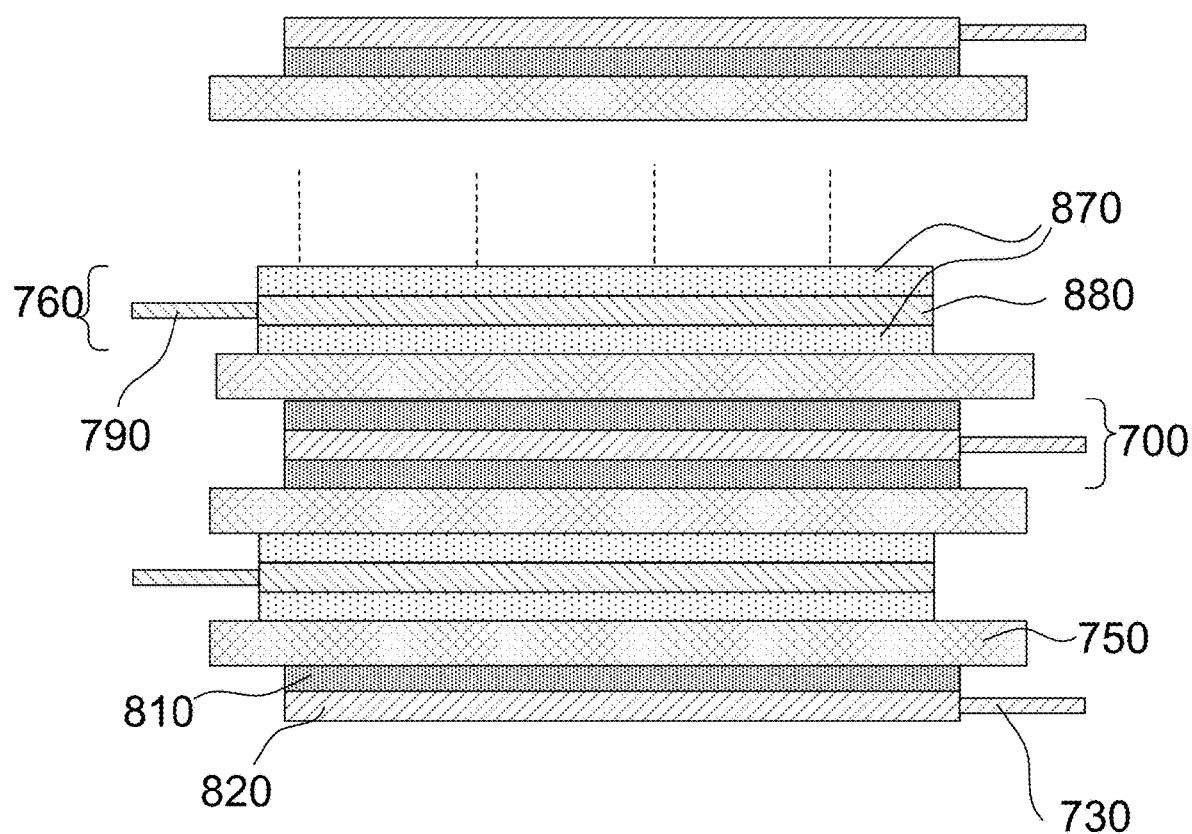
FIG. 8 illustrates anode/cathode alignment in a cell stack, according to an embodiment.

As disclosed herein, anode 700 may also be referred to as an "anode assembly." Each anode 700 further comprises a pair of anode foils 810 pressed together against the opposite sides of an anode current collector 820 having an anode current collector tab 730, as shown in FIG. 8. Anode foils 810 are positioned against anode current collector 820 in a manner such that an electrical contact is maintained. All of anode current collector tabs 730 are gathered and welded together to anode tab 330 (not shown in FIG. 8) which is then spot-welded to base 220 of the case 110. Alternatively, anode current collector tabs 730 are gathered and welded together to form anode tab 330. Anode foils 810 typically comprise, for example, lithium metal. Anode current collector 820 comprises a plate typically made, for example, of nickel or stainless steel and having a thickness of 0.005 inches or less. Anode current collector 820 may be a solid plate or a mesh. Other suitable materials and dimensions may be used.

As disclosed herein, cathode 760 may also be referred to as a "cathode assembly." Each cathode 760 further comprises a pair of cathode foils 870 pressed together against the opposite sides of a cathode current collector 880 having a cathode current collector tab 790, as shown in FIG. 8. Cathode foils 870 are positioned against cathode current collector 880 in a manner such that electrical contact is maintained therebetween. All of cathode current collector tabs 790 are gathered and welded together to cathode tab 430 (not shown in FIG. 8), which is electrically connected to cathode pin 150 of feedthrough assembly 130. Alternatively, cathode current collector tabs 790 are gathered and welded together to form cathode tab 430.

Figure 9:
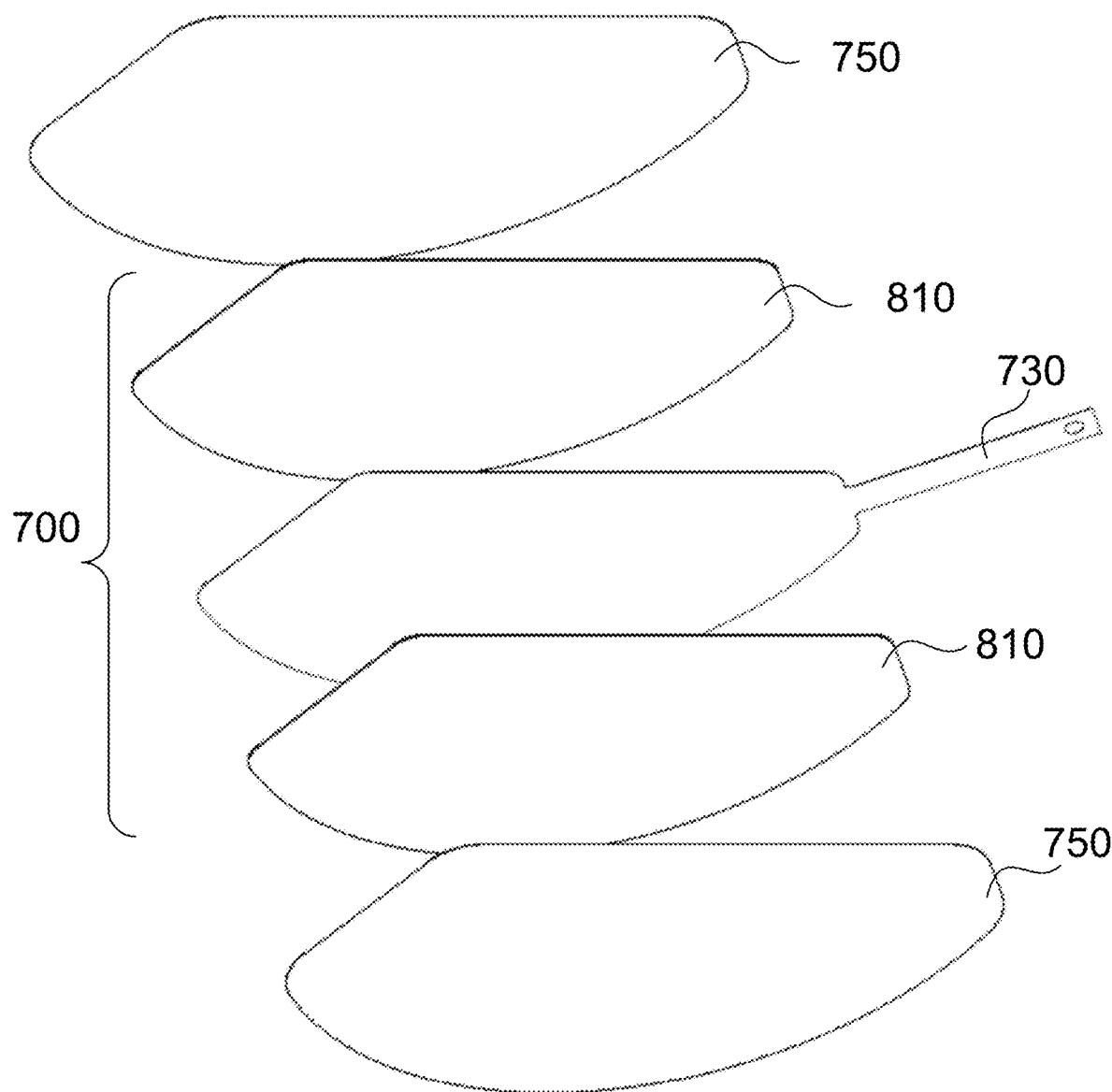
FIG. 9 is an exploded view of the anode, according to an embodiment.

FIG. 9 is an exploded view of anode 700 including separators 750. In some embodiments, anode 700 may be encapsulated by separators 750. Encapsulation may be accomplished by sealing anode foils 810 and anode current collector 820 in a shut-down separator bag (or sleeve) made of the same material that forms separators 750 to electrically insulate anode 700 from the cathodic surfaces of cell stack 300. Separator 750 is a permeable membrane that electrically isolates anode 700 from cathode 760, while still allowing the transport of ions, particularly Li+ ions, therethrough to facilitate passage of electric current in battery 100. Separator 750 (or the shut-down separator bag) may be made, for example, from a group of materials including paper, cotton, polyethylene, polypropylene, polytetrafluoroethylene, ceramics, rubber or mixtures thereof. Other suitable materials may be used.

Figure 10:
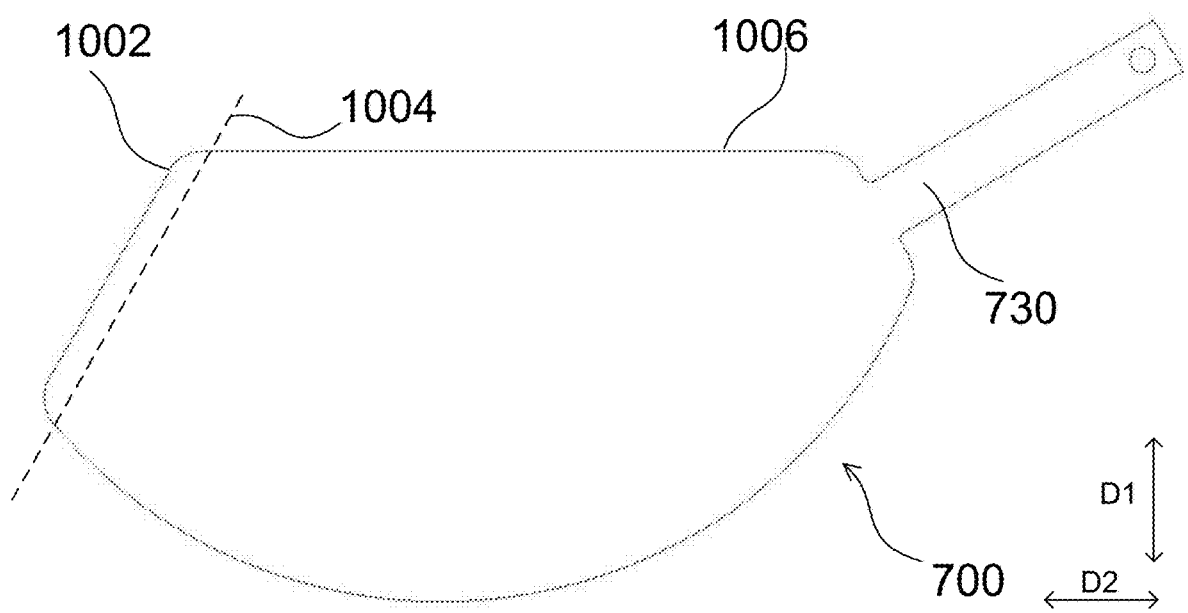
FIG. 10 is a plan view of the anode showing a dashed line as a division between the critical and non-critical areas of possible dendrite formation in the cell stack, according to an embodiment.

FIG. 10 is a plan view of anode 700. The outer edge or periphery of anode 700 comprises a first peripheral portion 1002 and a second peripheral portion 1006. A dashed line 1004 is shown in FIG. 10 to illustrate a division between first peripheral portion 1002 and second peripheral portion 1006. Line 1004 can be drawn at different positions on FIG. 10, as its position is for purposes of illustration only. No precise boundary between first peripheral portion 1002 and second peripheral portion 1006 is present, nor is one necessary. First peripheral portion 1002 is a portion of the outer edge of anode 700 that corresponds to a first peripheral portion 1402 (described below with reference to FIG. 14) of cathode 760 when anodes 700 are stacked with cathodes 760, and second peripheral portion 1006 is merely the remaining portion of the outer edge of anode 700 (including the portion adjacent to anode tab 730).

Figure 11:
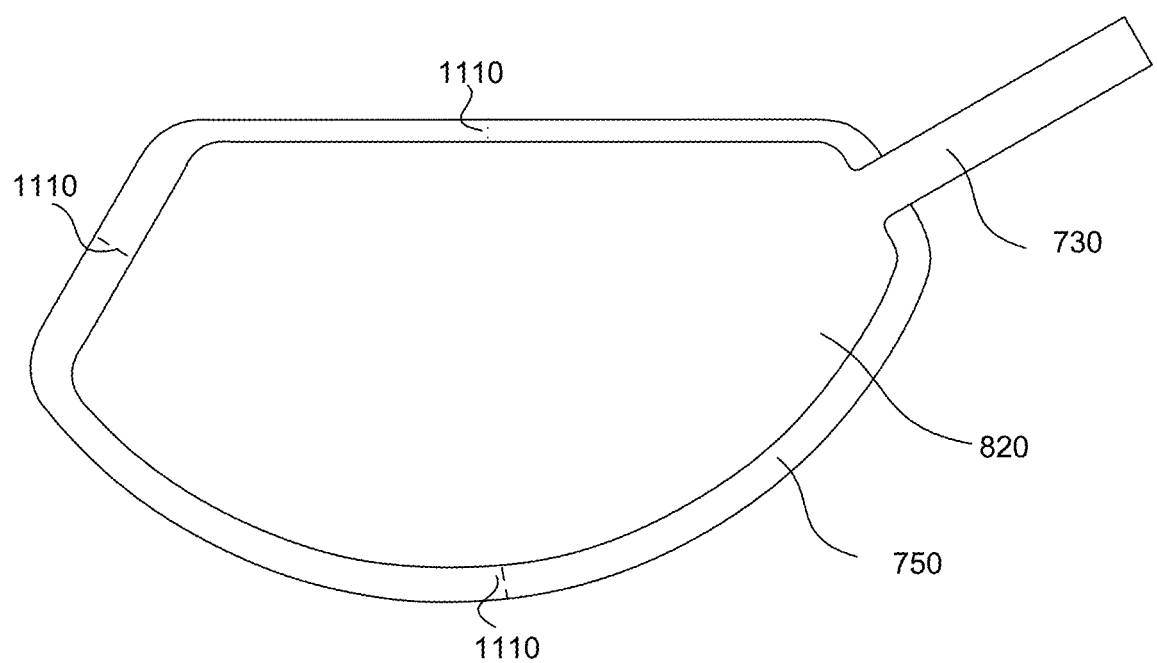
FIG. 11 is a plan view of the anode showing the periphery of a separator protruding beyond the periphery of the anode current collector, according to an embodiment.

FIG. 11 is a plan view of anode 700 showing the periphery of separator 750 protruding beyond the periphery of anode current collector 820 and anode foils 810 (not visible in FIG. 11). Anode foils 810 may be equally sized with anode current collector 820. In some embodiments, the protrusion of separator 750 outside the periphery of anode current collector 820 ensures complete electrical isolation between the anode 700 and the cathodic surfaces. As discussed above, in some embodiments, anode 700 is sealed in a shut-down separator bag.

In some embodiments, separator 750 extends outward beyond the entirety of the periphery of anode current collector 820 (and anode foils 810). The protrusion length 1110 at every point, measured in a direction perpendicular to the peripheral edges, may be at least two times the thickness of the anode, with a protrusion length of between about three times and about five times the anode thickness being preferred. In some embodiments, the protrusion length 1110 may be uniform around the periphery. In other embodiments, the protrusion length 1110 may be non-uniform or uniformly varying around the periphery.

Figure 12:
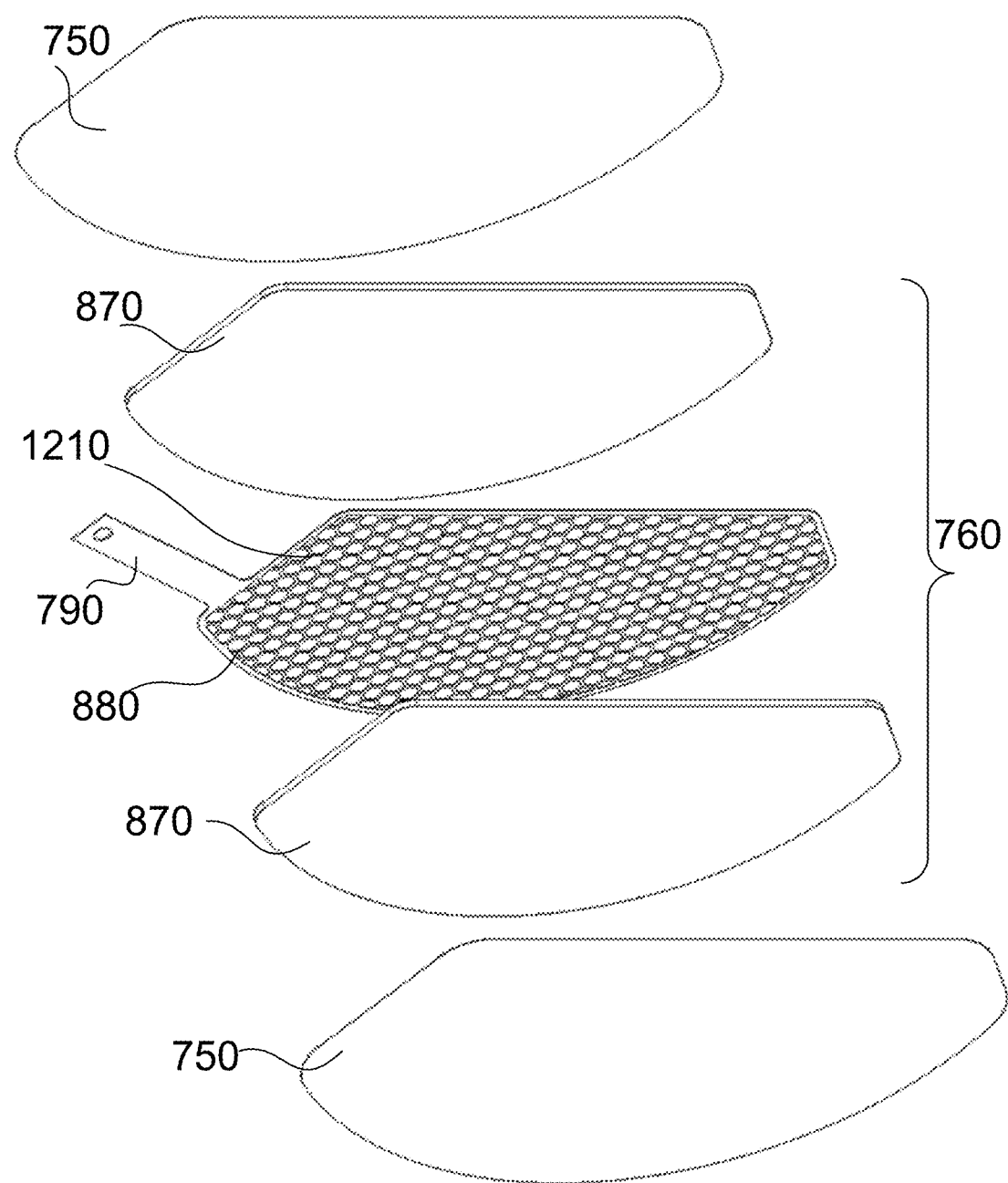
FIG. 12 is an exploded view of the cathode, according to an embodiment.

FIG. 12 is an exploded view of cathode 760 including separators 750. Cathode 760 may also be referred to as a "cathode assembly." Each cathode 760 consists of a pair of cathode foils 870 positioned together against opposite sides of cathode current collector 880 having cathode current collector tab 790. Cathode foils 870 are positioned against cathode current collector 880 in a manner such that electrical contact is maintained therebetween.

Each of cathode foils 870 consists of an active cathode material comprising, for example, a mixture of silver vanadium oxide (SVO) and a binder. In some embodiments, the cathode material comprises a mixture of silver vanadium oxide and carbon monofluoride (CFx). In an example embodiment, the active cathode material consists of a mixture containing 94% SVO, 2% carbon, 1% graphite, and 3% poly-tetrafluoroethylene (PTFE) by weight. Other compositional ranges may be used.

In some embodiments, cathode 760 may be encapsulated by separators 750. Each cathode may be sealed in a shut-down separator bag or sleeve made of the same material as separators 750 to electrically insulate the cathode 760 from the anodic surfaces of cell stack 300. In some embodiments, cathode current collector 880 comprises a mesh structure 1210.

In some embodiments, cathode foils 870 and cathode current collector 880 may be laminated together using pressure in the range of about 5 ksi to about 100 ksi. The pressure in ksi refers to kilopounds per square inch. In one example, a preferred pressure range is 30-60 ksi, and more preferably 40 ksi with an active loading range of 71 mg.cm$^{-2}$ to 73 mg.cm$^{-2}$. The cathode compaction force directly impacts the completed cell performance. Compaction forces greater than 52 ksi result in a decrease m power output when multiple pulses are performed. Compaction forces less than 47 ksi result in an increase in power output when multiple pulses are performed. The lower compaction force creates a less dense cathode and allows lithium ions to move more freely into the cathode. Furthermore, the lower compaction forces reduce the cell's polarization during multi-pulse performance and the cells depolarize more quickly. Both of these phenomena contribute to less lithium dendrite formation.

Figure 13:
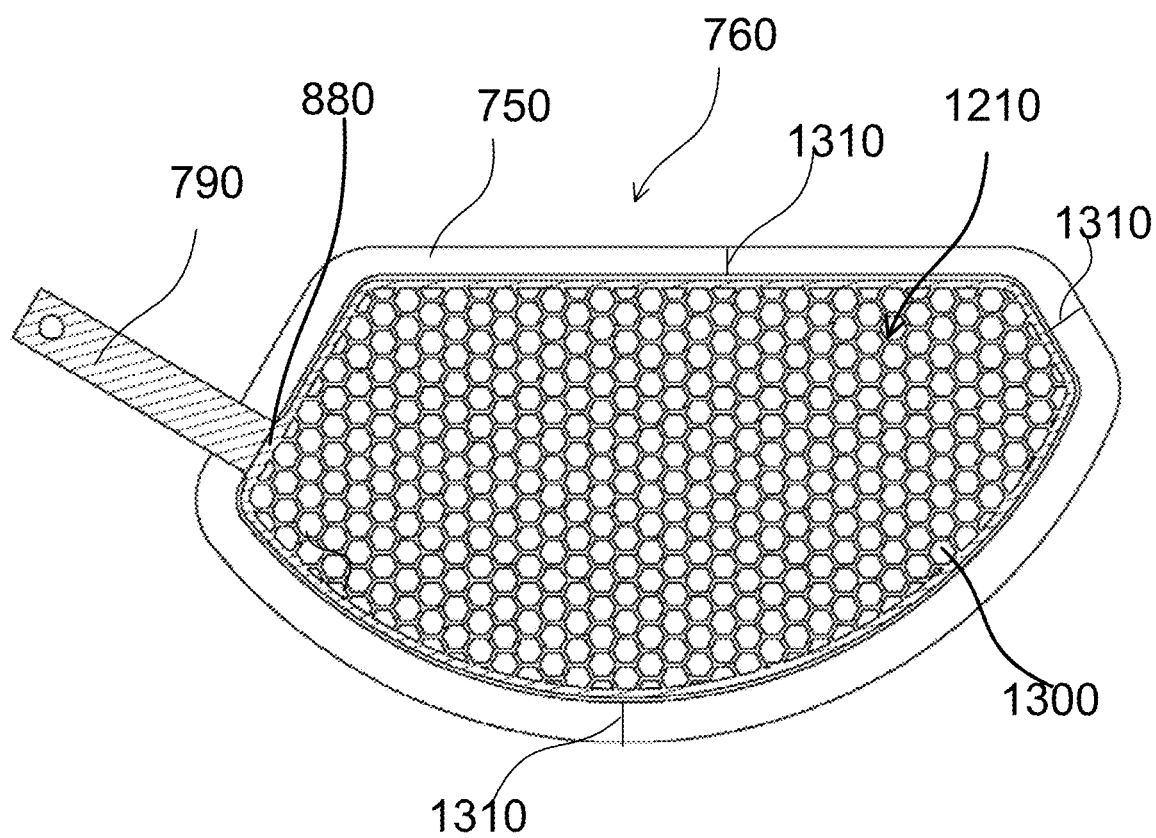
FIG. 13 is a plan view of the cathode showing the cathode current collector stacked on top of a cathode foil, and a separator.

FIG. 13 is a plan view of cathode 760 showing cathode current collector 880 stacked on top of a cathode foil 870, and a separator 750.

As discussed above, cathode current collector 880 may be formed from a mesh structure 1210. Mesh structure 1210 allows for active cathode material layers to be placed on either side of cathode current collector 880 and to be bonded both to the mesh structure 1210, and to each other through openings 1300 in mesh structure 1210. Openings 1300 may be repeated uniformly along the entire surface of cathode current collector 880 to form a repeating pattern. As disclosed herein, an opening percentage is referred to as the percentage of the surface area of the mesh structure 1210 that is represented by open space as compared to solid material. A higher opening percentage across the surface area of mesh structure 1210 reduces the weight and volume of cathode current collector 880. The reduced weight/volume may increase the total cell packing efficiency of battery 100.

In some embodiments, the opening percentage of mesh structure 1210, also referred to as the open-area percentage, may be in the range of about 20% to about 98%. In one example embodiment, an opening percentage of 60% to 80% is used. Other opening percentages may be employed.

In some embodiments, openings 1300 may be rectangles, squares, pentagons, hexagons, octagons, circles, or ovals, or combinations thereof. Other shapes may be suitably used. In one example embodiment, hexagonal openings are used. An advantage of hexagonal openings is that they do not include any acute angles, allowing the active cathode material on either side of mesh structure 1210 to bond together more easily through openings 1300, thereby strengthening the mechanical integrity of cathode 760.

In some embodiments, cathode current collector 880 and its associated mesh structure 1210 are machined, cast, stamped, forged, or otherwise formed from a metal such as aluminum, stainless steel, or titanium, or other suitable materials. In some embodiments, a conductive coating, such as a carbon coating, may also be applied to the surface of mesh structure 1210 to further promote binding strength and electrical conductivity. Cathode current collector 880 may have a total thickness in the range of about 0.001 inches to about 0.005 inches. Other dimensions may be used. More details on the cathode current collector designs and openings are described in commonly owned, co-pending U.S. patent application Ser. No. 15/649,270, filed Jul. 13, 2017, the disclosure of which is hereby incorporated herein by reference in its entirety.

In some embodiments, similar to the construction of anode 700, separator 750 extends outwardly beyond the outer edge or periphery of cathode current collector 880. The protrusion length 1310, measured in a direction perpendicular to the peripheral edges, is in the range of about 0.005 inches to about 0.4 inches. In some embodiments, the protrusion length 1310 may be uniform or non-uniform or may uniformly vary around the periphery of cathode current collector 880.

Figure 14:
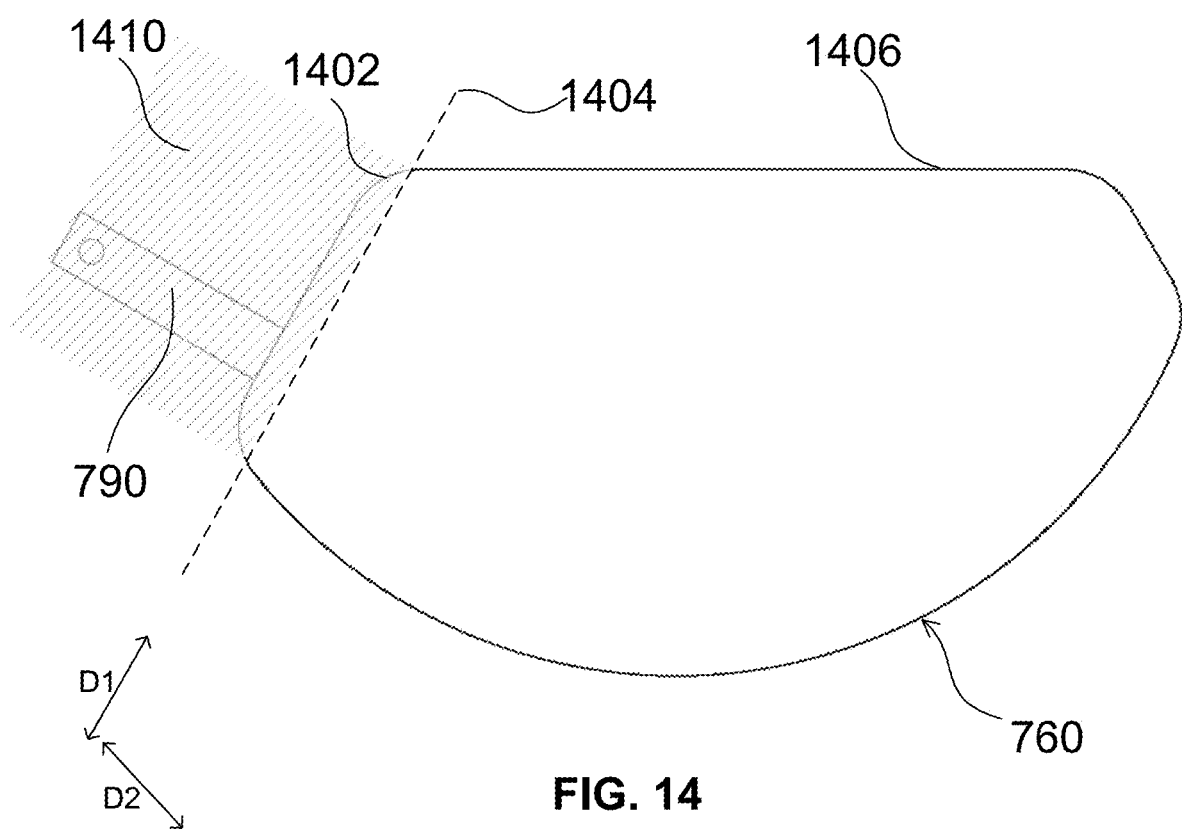
FIG. 14 is a plan view of the cathode showing a dashed line as a division between the critical and non-critical areas of possible dendrite formation in the cell stack, according to an embodiment.

FIG. 14 is a plan view of cathode 760. The periphery of cathode 760 comprises a first peripheral portion 1402 and a second peripheral portion 1406. A dashed line 1404 is shown in FIG. 14 to illustrate a division between first peripheral portion 1402 and second peripheral portion 1406. Line 1404 can be drawn at different positions on FIG. 14, as its position is for purposes of illustration only. No precise boundary between first peripheral portion 1402 and second peripheral portion 1406 is present, nor is one necessary. First peripheral portion 1402 is merely the portion of the outer edge of cathode 760 that includes and is adjacent to cathode tab 790, and second peripheral portion 1406 is merely the remaining portion of the outer edge of cathode 760 (i.e., the portion not adjacent to cathode tab 790).

In some embodiments, first peripheral portion 1402 refers, for example, to a portion of the periphery of cathode 760 that extends 0.15" to 0.75" from cathode tab 790 in a first direction D1 along the periphery of cathode 760, and that extends 0.15" to 0.75" from cathode tab 790 in a second direction D2 along the periphery of cathode 760. In some embodiments, first peripheral portion 1402 has a length that is 10% to 25% of the total length of the periphery of cathode 760.

First peripheral portion 1402 and second peripheral portion 1406 of cathode 760 are not physically or electrically separate portions of cathode 760. Similarly, first peripheral portion 1002 and second peripheral portion 1006 of anode 700 are not physically or electrically separate portions of anode 700. These peripheral portions are merely used to visualize the areas (also referred to as the "critical areas") between anode 700 and cathode 760 that are most susceptible to lithium dendrite formation. Hence, dashed line 1404 is positioned on cathode 760 at a sufficient distance from the edge of the cathode containing cathode tab 790 as to identify that portion of the cathode edge that is most susceptible to lithium dendrite formation.

An example critical area 1410 is shown in FIG. 14. Critical area 1410 comprises first peripheral portion 1402 and cathode tab 790. The non-critical area comprises second peripheral portion 1406. More generally, critical area 1410 includes regions where cathode tabs 790 exit cell stack 300, the 'header' of battery 100 where feedthrough assembly 130 exits battery case 110, and any location that contains cathodic surfaces that are not coated with cathodic materials.

In some embodiments, a method of fabricating SVO/lithium metal batteries that reduces the formation of lithium dendrites is provided. The reduction of lithium dendrites may be achieved by recessing first peripheral portion 1002 of anode 700 from first peripheral portion 1402 of cathode 760 (i.e., critical areas of lithium dendrite formation). In other words, the outer edge of anode 700 in critical area 1410 is recessed relative to the outer edge of cathode 760. In one exemplary embodiment, a stacking arrangement of anodes 700 with respect to cathodes 760 includes first peripheral portion 1402 of each cathode 760 protruding beyond first peripheral portion 1002 of each anode 700 by about 0.015 inches, and second peripheral portion 1006 of each anode 700 protruding beyond second peripheral portion 1406 of each cathode 760 by about 0.010 inches to about 0.045 inches (e.g., 0.015 inches in one example embodiment).

Lithium dendrites or clusters grow from anode lithium that extends beyond the active cathode material in critical area 1410 (e.g., the area adjacent cathode tab 790), also referred to herein as "lithium overhang." Once the lithium dendrites are formed, the growth path is along the electrical field lines from the anodic surface towards the cathodic charged surface. Experimental data suggests a strong correlation between lithium dendrite formation and the protrusion length in such critical area 1410. As the lithium overhang is reduced and even recessed, the occurrence of lithium dendrite formation is reduced.

Figure 15:
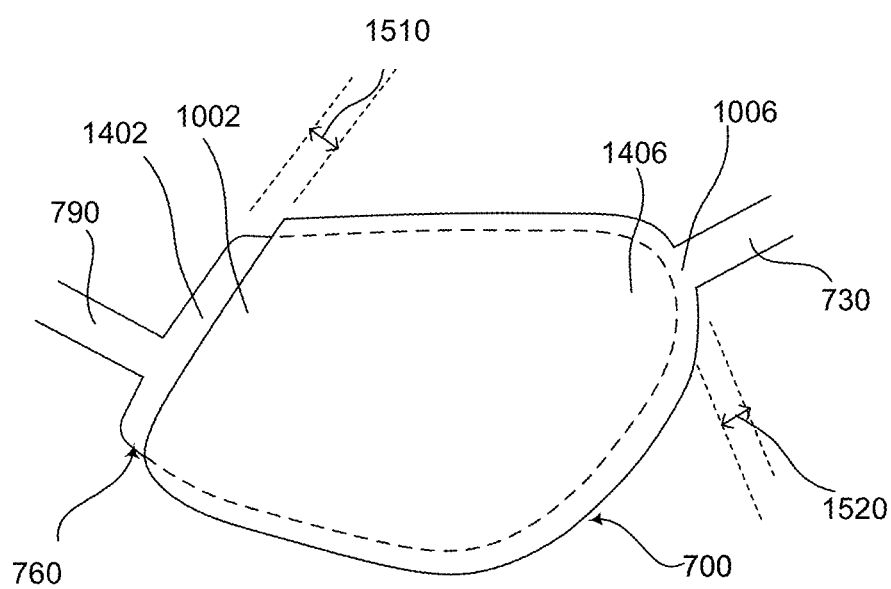
FIG. 15 illustrates the anode/cathode alignment in a cell stack, according to an embodiment.

FIG. 15 illustrates a preferred alignment of anode 700 and cathode 760, according to one embodiment, where anode 700 is offset from cathode 760 such that first peripheral portion 1402 of cathode 760 extends outward from first peripheral portion 1002 of anode 700 by a first offset 1510, and second peripheral portion 1006 of anode 700 extends outward from second peripheral portion 1406 of cathode 760 by a second offset 1520. First peripheral portion 1402 of cathode 760 and first peripheral portion 1002 of anode 700 comprise critical areas of cell stack 300, while second peripheral portion 1006 of anode 700 and second peripheral portion 1406 of cathode 760 comprise non-critical areas of cell stack 300.

In some embodiments, first offset 1510, also referred to as the protrusion length of first peripheral portion 1402 of cathode 760, is measured in a direction perpendicular to first peripheral edge 1002 of anode 700. According to some embodiments, first offset 1510 may have a length in the range of about 0.01 inches to about 0.08 inches. In one example embodiment, the length of first offset 1510 is 0.015 inches.

In some embodiments, second offset 1520, also referred to as the protrusion length of second peripheral portion 1006 of anode 700, is measured in a direction perpendicular to second peripheral portion 1406 of cathode 760. According to some embodiments, second offset 1520 may have a length in the range of about 0.01 inches to about 0.08 inches. In one example embodiment, the length of second offset 1520 is 0.015 inches. Though in non-critical areas, increasing second offset 1520 beyond about 0.03 inches increases the potential for lithium dendrite growth.

In one example embodiment, cell stack 300 is arranged in a manner such that lithium anode 700 is recessed (or negatively protruded) from the active cathodic area by a length in the range of about 0.005 inches to about 0.045 inches in critical areas near cathode current collector tabs 790 (i.e., first offset 1510), with a length of about 0.015 inches being preferred. Lithium anode 700 may extend outward from the active cathode area by up to 0.03 inches or more in non-critical areas (i.e., second offset 1520).

In some embodiments, second offset 1520 may be equal to zero. In other embodiments, second offset 1520 may be negative (i.e., second peripheral portion 1406 protrudes with respect to second peripheral portion 1006). In some embodiments, second offset 1520 may vary along its length. Similarly, while first offset 1510 relates to critical areas for lithium dendrite growth, first offset 1510 may vary along the length of first peripheral portions 1002 and 1402.

In some embodiments, cell stack 300 consists of a plurality of anodes 700 interposed between a plurality of cathodes 760. Each of the plurality of anodes and cathodes are physically and electrically isolated by separators 750. In one example embodiment, cell stack 300 consists of ten (10) cathodes 760 and eleven (11) anodes 700. In some embodiments, the plurality of cathodes, in their entirety, are sandwiched between two anodes such that the top and the bottom layers of cell stack 300 comprise an anode 700, as shown in FIG. 8. Top and bottom anodes in a completed cell stack 300 may comprise an anode foil 810 disposed only on one side of anode current collector 820, such that anode foil 810 is sandwiched between anode current collector 820 and separator 750. The top anode of cell stack 300 comprises an anode current collector 820 disposed on an anode foil 810, separated from underlying cathode 760 by separator 750.

Figure 16A:
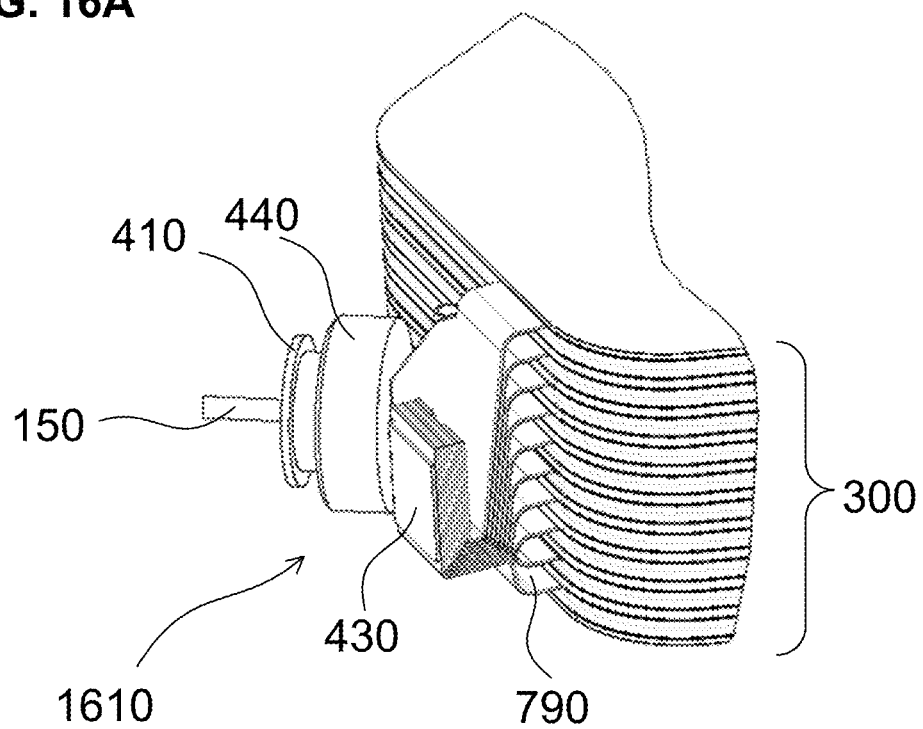
FIG. 16A is a perspective, cutaway view showing a folded cathode tab connected to a feedthrough assembly, according to an embodiment.

In some embodiments, battery 100 may comprise a folded feedthrough assembly 1610, as shown in FIG. 16A. Folded feedthrough assembly 1610 comprises a plurality of cathode current collector tabs 790 physically and electrically connected together to form cathode tab 430. Tab 430 is then folded to form a U shape. Alternatively, cathode current collector tabs 790 may be welded after they are formed and folded. In some embodiments, cathode current collector tabs 790 may be soldered, brazed, welded, pressed, glued using electrically conductive adhesives, or electrically connected to one another by other means.

In some embodiments, feedthrough assembly 130 is attached to cathode tab 430 with a ribbon of cathode collector material or electrically conducting ribbons or ribbon-like material configured to provide strain-relief and structural flexibility.

Figure 16B:
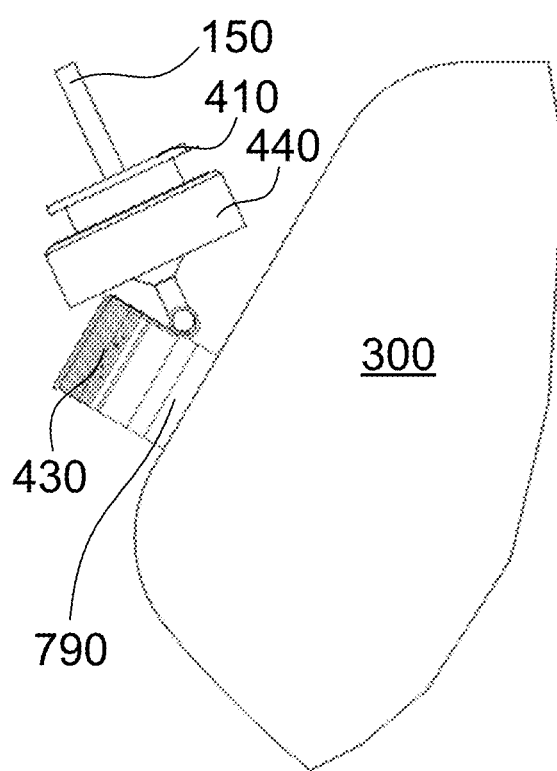
FIG. 16B is a plan view showing a folded cathode tab connected to a feedthrough assembly, according to an embodiment.

FIG. 16B is a plan view illustrating cathode pin 150 physically and electrically connected to cathode tab 430. Cathode pin 150 may be attached to cathode tab 430 by welding, soldering, brazing, using a conductive adhesive, or by using other suitable methods.

Figure 17:
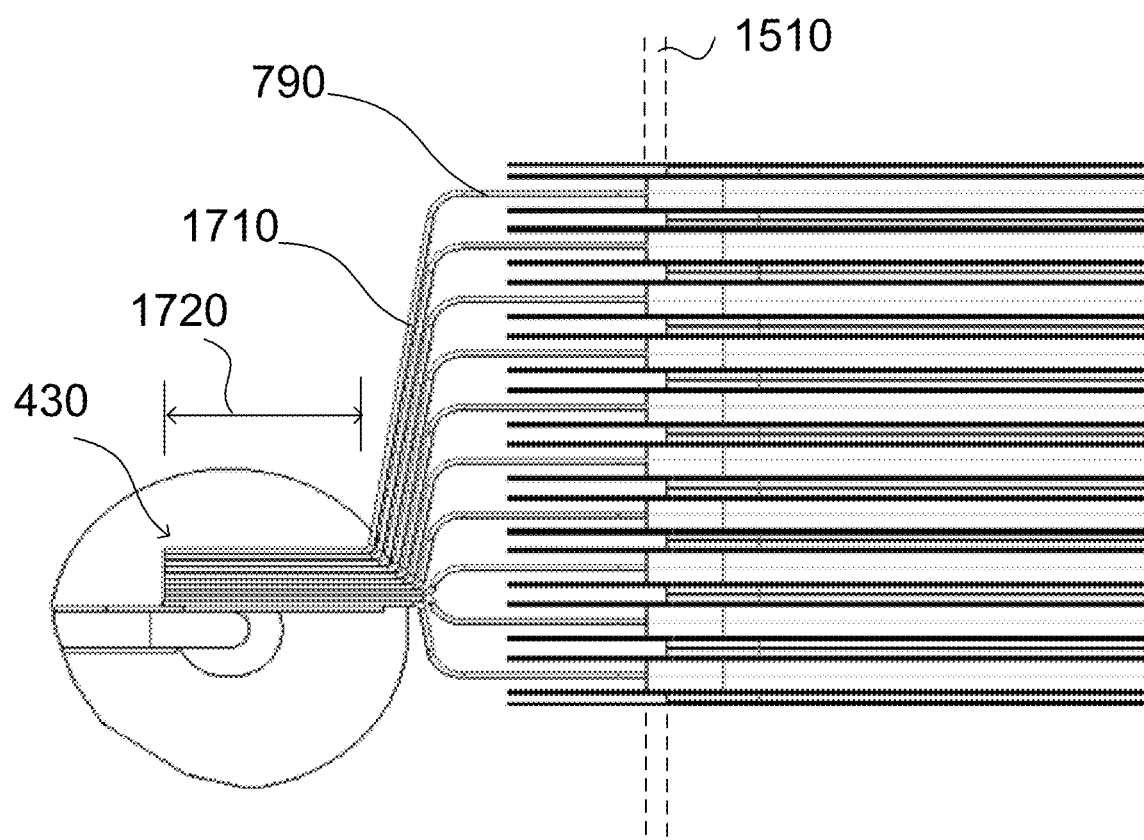
FIG. 17 is a sectional view of a cell stack showing a cathode tab connected to a feedthrough assembly, according to an embodiment.

In some embodiments, cathode tab 430 may be formed by extending individual cathode current collector tabs 790, as shown in FIG. 17. As shown, cathode tab 430 may be formed by attaching electrically conducting cathode ribbons 1710 (or ribbon-like structures) to cathode current collector tabs 790, and welding all of conducting cathode ribbons 1710 together. Alternatively, cathode tab 430 may be formed by welding together extensions of cathode current collector tabs 790. Conducting cathode ribbons 1710 may be bent or folded into a desired shape. In one example embodiment, conducting cathode ribbons 1710 are bent, welded and trimmed.

In some embodiments, cathode tab 430 may have a length 1720 in the range of 0.05 inches to 1.0 inches, or in the range of 0.05 inches to 0.5 inches. In one example embodiment, the length 1720 of cathode tab 430 is 0.1 inches.

Figure 18:
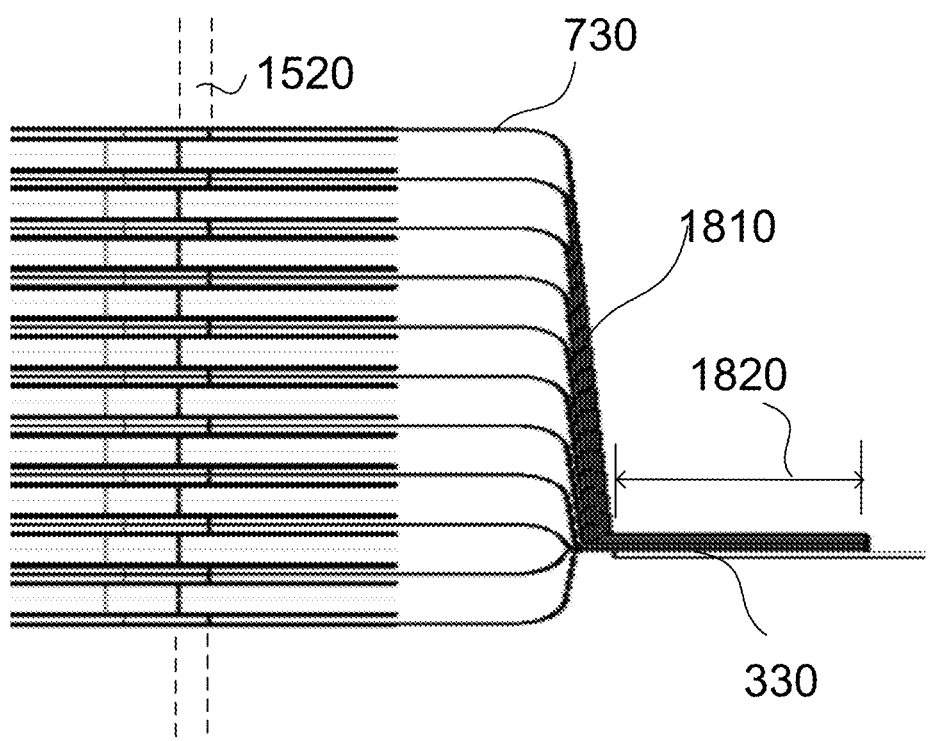
FIG. 18 is a sectional view of a cell stack showing an anode tab, according to an embodiment.

In some embodiments, anode tab 330 may be formed by extending individual anode current collector tabs 730, as shown in FIG. 18. As shown, anode tab 330 may be formed by attaching electrically conducting anode ribbons 1810 (or ribbon-like structures) to anode current collector tabs 730, and welding all of conducting anode ribbons 1810 together. Alternatively, anode tab 330 may be formed by welding together extensions of anode current collector tabs 730. Conducting anode ribbons 1810 may be bent or folded into a desirable shape. In one example embodiment, conducting anode ribbons 1810 are bent, welded and trimmed.

In some embodiments, anode tab 330 may be formed by welding, brazing, pressing, soldering, or gluing together (using a conductive adhesive) anode current collector tabs 730. In some embodiments, conducting anode ribbons 1810 enhance the flexibility of the joints and mechanical integrity of battery 100.

In some embodiments, anode tab 330 may have a length 1820 in the range of 0.05 inches to 1.0 inches, or in the range of 0.05 inches to 0.5 inches. In one example embodiment, the length 1820 of anode tab 330 is 0.08 inches.

The anode/cathode assembly described above, including the offset between the anode and cathode layers, may be used independently in any battery structure, or may be used in combination with any or all of the insulating boot and feedthrough assemblies described above, including overmolded feedthrough assemblies.

EXAMPLES

SVO/Lithium batteries of different designs were built and tested for standard burn-in and pulsing operations. Different designs of insulating boots, overmolded feedthroughs, and combinations thereof were tested for mechanical as well as electrical performance. The general cell build procedure and testing protocols with results are discussed below.

A general cell build procedure for a single battery was as follows. Standard SVO and sheeting processes were used to generate cathode foils that are 94% active SVO, 3% PTFE, 2% graphite, and 1% carbon by weight. The cathode assembly or cathode, as referred to herein, with a cathode foil on each side of a current collector, was pressed at 69,000 lbs. and laminated. The weight of the cathode was 0.75 g to 0.80 g without the collector. The laminated cathodes were then dried under vacuum at 120° C. for six hours and were sealed with shut-down separator bags.

The anode assembly or anode, as referred to herein, with lithium on each side of the anode current collector was prepared. The lithium weight was between 0.055 g and 0.069 g. Two anodes were separately created with lithium only on one side of the anode current collector to form the top and bottom anodes. The anodes were then sealed with shut-down separator bags.

The cell stack was formed by stacking the created anodes and cathodes in an alternating fashion, verifying that the outer anode lithium faced the cathode. The anodes and cathodes were stacked so that the edges of the anodes were recessed by about 0.015" from the edges of the cathodes in the critical area. The anode current collector tabs, the cathode current collector tabs, the feedthrough, and the case connection were all welded. The tail boot and the front boot were then placed on the stack. The anodes and the cathodes were welded to the case, electrical pins were added, and the cell was filled with an electrolyte to a minimum E/C ratio of 0.25. The E/C ratio is the ratio of grams of electrolyte/grams of cathode, where the cathode weight is the weight of the cathode active material and does not include the weight of the current collector or separators.

Batteries with two different designs of feedthroughs and three different designs of insulating boots were fabricated and tested. The designs of the feedthroughs are referred to as Revision OF1 and Revision OF2. The designs of the insulating boots are referred to as Revision IB1, Revision IB2, and Revision IB3. Revision OF1 consisted of a feedthrough assembly in which the feedthrough pin extends through the body/housing of a glass-to-metal-seal (GTMS) feedthrough. A separate insulating cover or a feedthrough insulation was either overmolded or glued with an adhesive to the body of the GTMS feedthrough, such that a portion of the metal body/housing of the GTMS feedthrough remained exposed on the inside of the case after the insulation was attached. The insulating cover was made of a plastic material capable of creating a liquid-tight seal between the body and the pin (or a wire connected to the pin).

Revision OF2 consisted of a feedthrough assembly in which the metal ferrule of the GTMS feedthrough was overmolded with the insulation material such that the entire GTMS feedthrough was covered on the inside of the case, leaving no portion exposed.

Insulating boot Revision IB1 consisted of a top half and a bottom half of the front portion of the insulating boot. The top and the bottom halves each had a portion machined out such that they formed an opening to receive therein the GTMS feedthrough assembly. The insulating boots were made from vacuum formed plastic compatible with the electrochemical system and that could be thermally bonded to the feedthrough insulation to create a liquid-tight seal between the feedthrough and the insulating boot.

Insulating boot Revision IB2 consisted of a one-piece front portion with a feedthrough opening configured to receive the overmolded feedthrough assembly OF2. As illustrated in FIG. 4A, the front portion of the insulating boot and the feedthrough insulation of the feedthrough assembly were bonded together to form a continuous and impenetrable hermetic seal at the feedthrough opening in the insulating boot such that a portion of the overmolded feedthrough was exposed.

Insulating boot Revision IB3 consisted of a one-piece front portion with a feedthrough opening configured to receive the overmolded feedthrough assembly OF2. As illustrated in FIG. 5, the front portion of the insulating boot and the feedthrough insulation of the feedthrough assembly were bonded together to form a continuous and impenetrable hermetic seal at the feedthrough opening in the insulating boot such that no portion of the overmolded feedthrough was exposed.

Lithium dendrite formation occurs when the cell depolarizes after a high current discharge event. Pooled electrolyte outside of the cell stack is a preferred location for lithium dendrite formation. The goal of the lithium dendrite test method is to create sufficient cell polarization to grow lithium clusters or dendrites. However, the cell will hit a polarization limit resulting in no significant increase in cell polarization after approximately six pulses.

During testing, the cells were placed with the pins facing downward such that the cell was held in a worst case orientation to pool the electrolyte in the most sensitive areas and try to generate lithium dendrite growth by performing multiple polarizing pulses, resting, and repeating. The electrical testing cycle included a first pulse train consisting of 16 pulses at 4.0 Amps followed by 6 pulses at 4.4 Amps every 24 hours until at least half of the cell is depleted. This testing protocol generates approximately 300 hours of polarization time in an orientation. After pulse testing completes, the cell is held for at least 96 hours and the voltage monitored. A DPA (Destructive Physical Analysis) of the cells was performed after the test was completed. A decrease in the OCV indicates a lithium dendrite has connected a cathodic surface to an anodic surface.

Four batteries with a combination of Revision OF1 and Revision IB1 were fabricated and tested according to the procedure described above. The burn-in and acceptance pulse results for all the cells with OF1 and IB1 indicated that lithium dendrites breached the insulation between the front portion of the insulating boot and the feedthrough, resulting in failures due to electrical shorts.

Twenty batteries with a combination of OF2 and IB2 were fabricated and tested according to the procedure described above. The electrical test results for all the cells with OF2 and IB2 indicated that all the cells prevented lithium dendrites from breaching the insulation around the feedthrough assembly. The test did produce dendrite formation in other areas of the battery, none of which were problematic. The lithium dendrite formation near the cathode tab did not breach any of the seals, and there was no lithium dendrite formation under the overmold on the feedthrough glass area.

Twenty batteries with a combination of OF2 and IB3 were fabricated and tested according to the procedure described above. The electrical test results for all the cells with OF2 and IB3 indicated that all the cells passed lithium dendrite testing. None of the cells had any dendrites inside the insulation around the feedthrough and the cathode connections and inside the feedthrough insulation as well. The test did produce dendrite formation in other areas of the battery, none of which were problematic. The lithium dendrite formation near the cathode tab did not breach any of the seals, and there was no lithium dendrite formation under the overmold on the feedthrough glass area.

Ceramic Coating

Figure 19A:
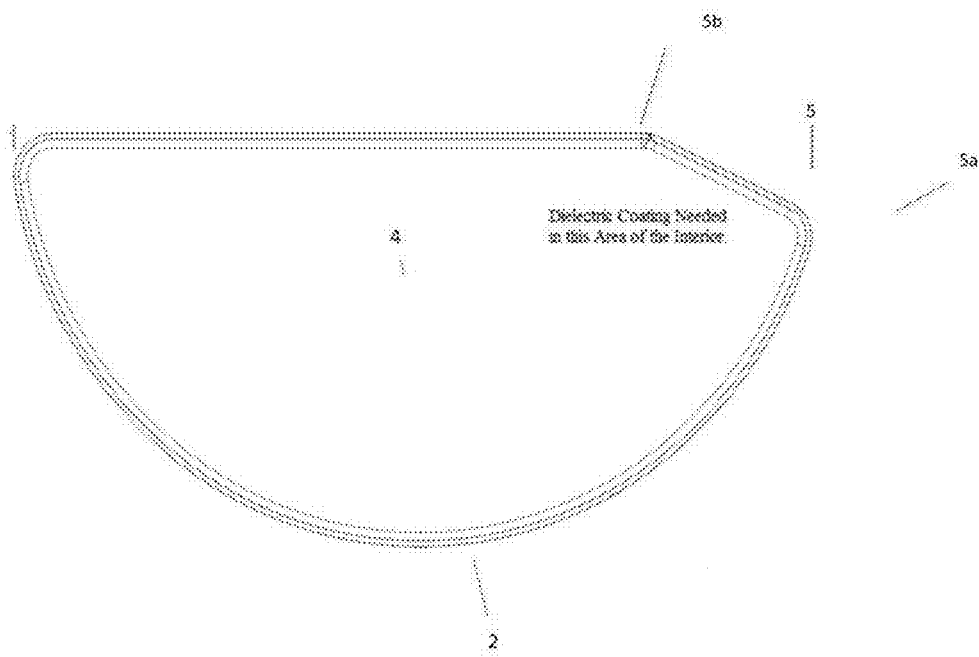
FIGS. 19A-B illustrate various elements of a battery housing according to embodiments of the disclosure.

FIG. 19A depicts battery case 2 thermally sprayed with a coating 4 of a dielectric material on its interior surfaces and interior walls. Advantageously, thermal spraying can provide an insulative coating that is sufficiently thin so as not to substantially add to electrochemical cell size, while being sufficiently thick to provide a permanent, more durable coating able to withstand higher voltages when compared to other coating processes, such as chemical vapor deposition. The coating may be sprayed on the entire interior surface or a partial area of interest. For instance, if the cathode is at one end of the case, then an area within 0.5" of the area in which the cathode tabs and feedthrough assembly will be located is sufficient.

Battery case 2 comprises a feedthrough lip 5, wherein the end 5a of the feedthrough lip 5 is at approximately a 25 degree angle with an adjoining wall of the battery case 2, and an end 5b of the feedthrough lip 5 is at approximately a 90 degree angle with an adjoining wall of the battery case 2. In certain embodiments, only the area between ends 5a and 5b ("the feedthrough lip area") and the area within a certain distance of the ends 5a and 5b of the feedthrough lip 5 (a peripheral portion adjacent the feedthrough lip area) (areas where the formation of lithium dendrites or a hard short circuit could interfere with battery performance) are coated with dielectric coating 4. The term "adjacent" includes "directly adjacent" (no intermediate materials, elements or space disposed therebetween). In a particular example, case 2 is about 1.80 inches in length and only the area between ends 5a and 5b and the area within about 0.5 inch around the peripheral portion adjacent the feedthrough lip 5 are coated with dielectric coating 4.

Figure 19B:
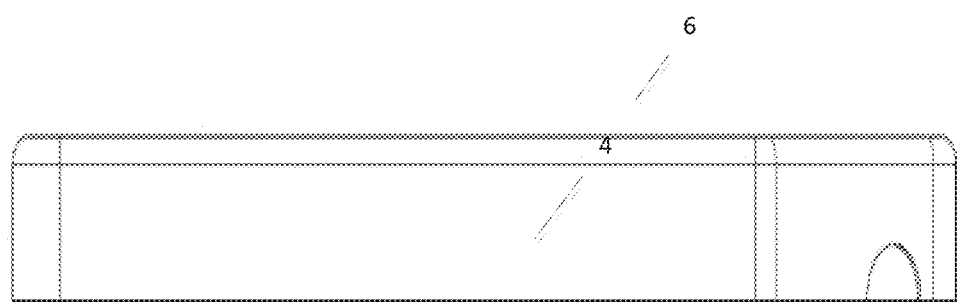

FIG. 19B depicts battery lid 6 which has been thermally sprayed with a coating 4 of a dielectric material on its interior surfaces and interior walls. Battery lid 6 comprises feedthrough aperture 8. In certain embodiments, only the area immediately surrounding feedthrough aperture 8 and the area within a certain distance of feedthrough aperture 8 are coated with dielectric coating 4. In certain embodiments, the exterior surfaces and the exterior walls of the battery case 2 and battery lid 6 remain clean. Dielectric coating 4 is of sufficient thickness and composition to prevent battery case 2 and battery lid 6 from being anionic at the feedthrough lip 5. Dielectric coating 4 is also of sufficient thickness to prevent or mitigate lithium dendrite formation between cathode and anode surfaces, and to prevent hard short circuits. The thickness of dielectric coating 4 may vary as a function of the insulating properties of dielectric coating 4 and the required voltage of the battery. Dielectric coating 4 may be no more than about 0.03 inches thick. In certain embodiments, dielectric coating 4 is between about 0.002 inches and about 0.012 inches thick. In certain other embodiments, dielectric coating 4 is about between about 0.003 to about 0.004 inches thick. In certain embodiments, the thermal spray dielectric material comprises one or more ceramic oxides and/or polymers. In certain preferred embodiments, the thermal spray dielectric material comprises an oxide of aluminum, titanium, and/or other similar ceramic oxide. In an embodiment, the thermal spray dielectric material is aluminum oxide. In an embodiment, the thermal spray dielectric material is aluminum oxide having a thickness of about 0.004 inches for use in a lithium carbon monofluoride ($CF_x$)/silver vanadium oxide (SVO) cell having a required voltage of 600-800V, for example the lithium $CF_x$/SVO cells disclosed in U.S. Pat. Nos. 6,551,747, 5,667, 916, or 5,180,642, the disclosures of both of which are hereby incorporated herein by reference in their entireties.

Techniques for applying the ceramic coatings include air plasma thermal spray (APS), low pressure plasma spray (LPPS), high velocity oxygen fuel (HVOF) sputtering, and electron beam physical vapor deposition (EBPVD), chemical vapor deposition, etc. In an embodiment, the ceramic coating is applied by an electrical heating spray process such as electric-arc or twin-wire arc spraying or plasma spraying.

The electrical heating thermal spraying process, referred to as the twin-wire arc spraying process, uses two consumable metal wires. The wires are initially insulated from each other and simultaneously advanced to meet at a focal point in an atomizing gas stream. Contact tips serve to precisely guide the wires and to provide good electrical contact between the moving wires and power cables. Heating is provided by means of a direct current potential difference applied across the wires to form an arc that melts the intersecting wires. A jet of gas (normally compressed air) shears off molten droplets and propels the droplets onto the substrate. Sprayed material particle sizes can be changed with different atomizing heads and wire intersection angles. Direct current is supplied at potentials of about 18 to 40 volts, depending on the material to be sprayed; the size of the particle spray increasing as the arc gap is lengthened with a rise in voltage. Voltage is therefore maintained at a higher level consistent with arc stability to provide larger particles and a rough, porous coating. Because high arc temperatures (in excess of about 7,240° F.) are typically encountered, twin-wire arc sprayed coatings have high bond and cohesive strength.

Plasma spraying involves the passage of a gas or a gas mixture through a direct current arc maintained in a chamber. The arc is initiated with a high frequency discharge that partially ionizes the gas to create a plasma having temperatures that may exceed 15000 K, which makes it possible to spray refractory materials such as oxides. The plasma flux exits the gun through a hole in the anode which acts as a nozzle and the temperature of the expelled plasma effluent falls rapidly with distance. Powdered electrode active material feedstock is introduced into the hot gaseous effluent at an appropriate point and propelled to the workpiece by the high velocity stream. The heat content, temperature and velocity of the plasma gas are controlled by regulating the arc current, gas flow rate, and the type and mixture ratio of the gases. Parameters that influence the interaction of the particles with the plasma jet and the substrate, and therefore the deposit properties, include feedstock type, plasma gas composition and flow rate, energy input, torch offset distance, and substrate cooling.

In certain embodiments, high velocity oxygen fuel (HVOF) spraying is used to apply a coating of aluminum oxide that is about 0.004 inches thick to the case/lid of a lithium $CF_x$/SVO electrochemical cell. A gaseous or liquid fuel is mixed with oxygen and combusted to produce a pressurized hot gas. The hot gas is expelled through a nozzle at very high speeds. A powder feedstock is injected into the gas stream which accelerates the powder rapidly toward the substrate to be coated. The powder partially melts in the gas stream and is deposited on the substrate. An HVOF spray is believed to provide a ceramic coating that is dense, permanent, crack-free, and resistant to the welding process, and is a preferred method of applying the dielectric coating 4. In certain embodiments, HVOF is used to provide a high density ceramic coating on the interior surfaces/walls of a battery case and lid, the anodes and cathodes are offset from each other around the feedthrough, and an insulating boot either completely, or at least partially, surrounds the cell stack to prevent short circuits.

In an embodiment, the ceramic coating is applied by electron beam physical vapor deposition (EBPVD) due to the columnar microstructure with inter-column gaps produced. The ceramic coating is deposited as a layered microstructure to match the coefficient of thermal expansion (CTE) of the battery case 2 to prevent cracking of dielectric coating 4.

Prior to thermally spraying the ceramic coating onto the interior surfaces of the battery case 2 and battery lid 6, the surfaces may be cleansed of contaminants, such as lubricants from handling equipment or body oils from human hands. Suitable substrate surface preparation techniques include scraping, wire brushing, machining, grit blasting, or chemical action. The cleansed surface is coated as soon as possible after preparation to prevent the possibility of contamination or surface oxidation.

The surfaces may be roughened in order to properly applying the thermal spray coating. Three methods of roughening the surfaces consist of rough threading, grit blasting, and a combination of rough threading, then grit blasting, as are well known to those skilled in the art of thermal spraying techniques. In certain embodiments, the dielectric coating can be super-finished to an average surface roughness of 4 micro inches or less.

In certain embodiments, an inter-metallic bonding film may be applied between the interior walls and interior surfaces of battery case 2/battery lid 6 and dielectric coating 4 to insure bonding of the thermal spray ceramic to the metallic battery case 2 and battery lid 6.

In certain embodiments, a dielectric sealant layer may be added to enhance the performance of dielectric coating 4 in harsh environments (e.g., during the welding process). In certain preferred embodiments, the sealant is not conductive, i.e., the sealant should not interfere with, or at least not significantly impact, the insulative properties of dielectric coating 4.

Figure 20:
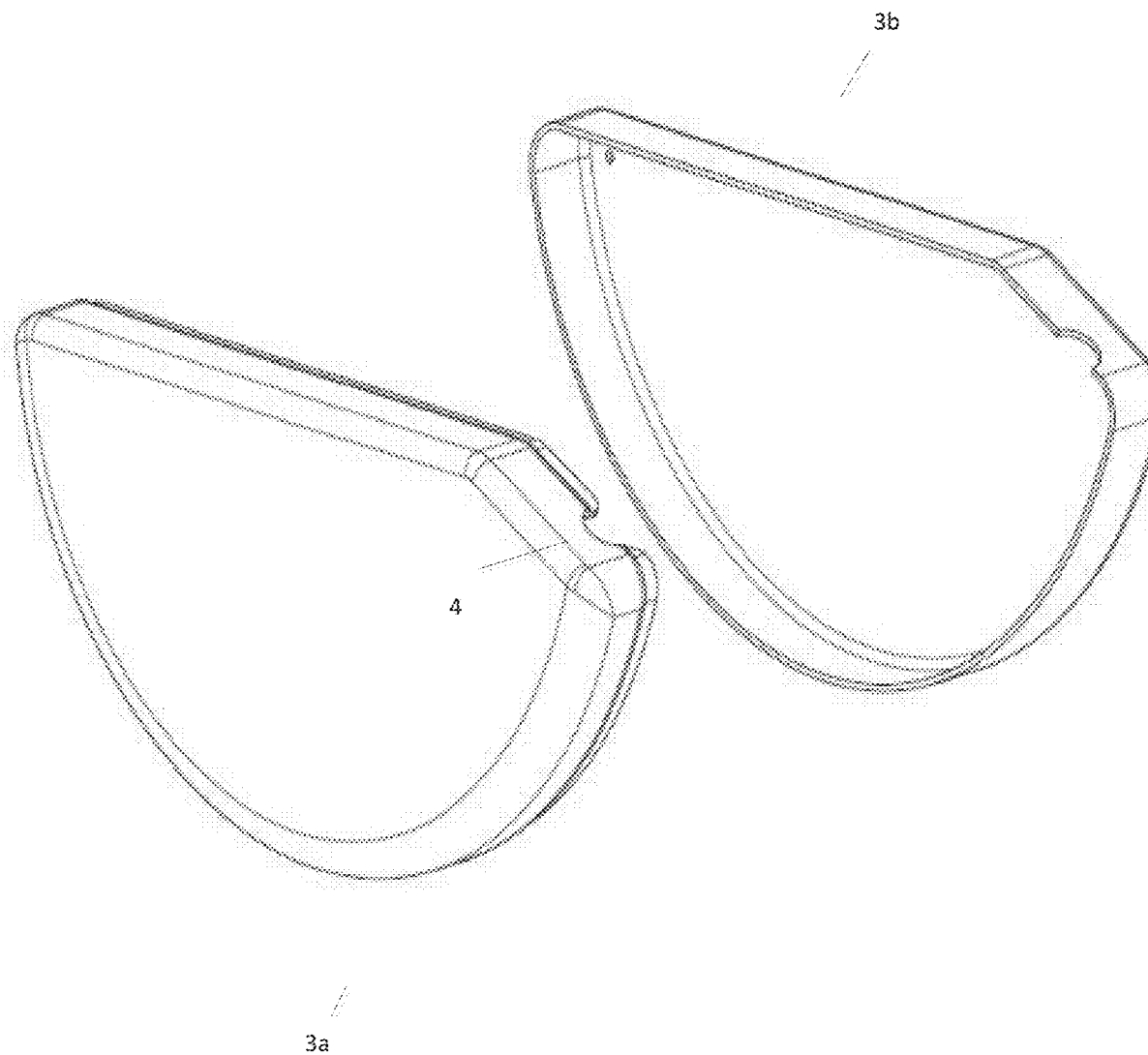
FIG. 20 depicts various elements of a battery housing according to embodiments of the disclosure.

FIG. 20 depicts a top cover 3a and bottom cover 3b of a battery case or housing according to embodiments of the disclosure. In certain embodiments, top cover 3a and bottom cover 3b are laser welded together using welds that are approximately 0.032 inches wide to form a battery housing. In certain embodiments, rotary friction welding may be used. The properties of dielectric coating 4 provide protection against high temperatures, such that the coating may survive the welding process unharmed. In certain embodiments, a stress-relieving metallic interlayer may be used between the battery case and the dielectric coating 4. The stress-relieving metallic interlayer may absorb the stresses caused by the thermal expansion difference between the case material and the dielectric coating 4 during the welding process. In certain embodiments, the stress-relieving metallic interlayer is an aluminum interlayer which acts as a ductile buffer capable of absorbing deformations and stresses related to the high temperature gradient during the cooling phase.

Also, dielectric coating 4 is configured not to interfere with the sealing properties of the laser weld. In addition, the properties of dielectric coating 4 are preferably such that dielectric coating 4 survives contact with the electrolyte without substantial degradation or corrosion.

FIG. 21A depicts battery lid 6 having a feedthrough aperture 8 and dielectric coating 4 on its interior surfaces and interior walls. In an embodiment, the coating is sprayed on the entire interior surface of the battery lid 6. In another embodiment, the coating is sprayed only on a partial area of interest of the interior surface. For instance, if the cathode is at one end of the case, then coating an area within 0.5 inches of the cathode tabs and feedthrough assembly is sufficient. FIG. 21B depicts battery case 2 having a feedthrough lip 5 and dielectric coating 4 on the interior surfaces and interior walls of battery case 2. In certain embodiments, dielectric coating 4 may be applied only near exposed cathode areas, such as the feedthrough or cathode tabs. FIG. 21C illustrates an embodiment in which the feedthrough is at one end and the welding is at the opposite end. In certain embodiments, dielectric coating 4 is only applied at the feedthrough end.

The ceramic coatings described above may be (i) applied independently in any battery structure; (ii) applied to batteries having any or all of the insulating boot and feedthrough assemblies described above, including overmolded feedthrough assemblies; (iii) applied to batteries having the anode/cathode relationships described above, including the offset between the anode and cathode layers; or (iv) applied to batteries having any or all of the insulating boot and feedthrough assemblies described above, including overmolded feedthrough assemblies, as well as the anode/cathode relationships described above, including the offset between the anode and cathode layers.

Figure 22A:
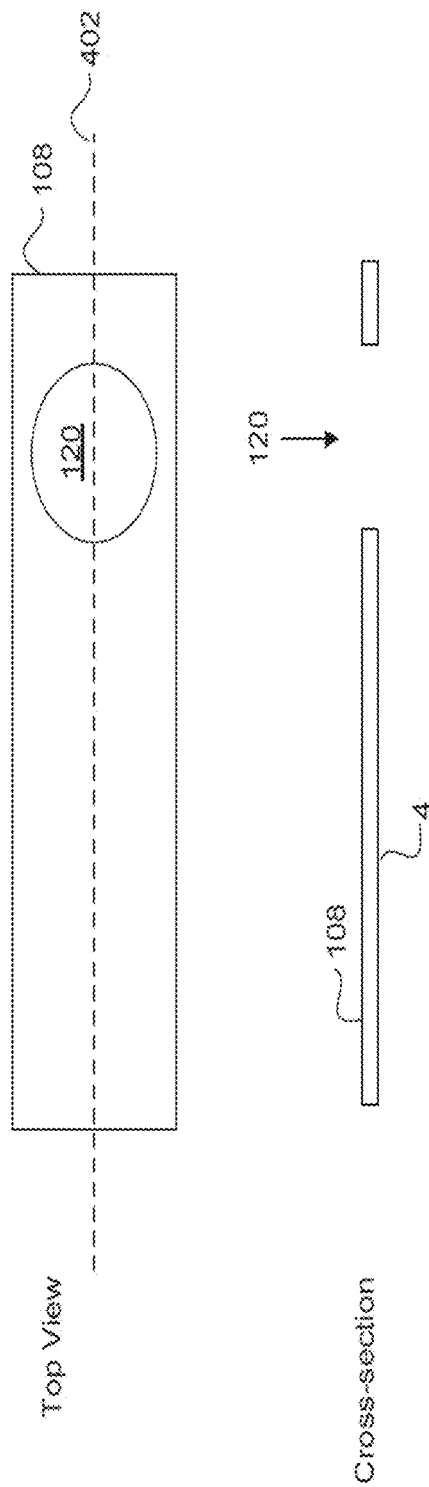
FIGS. 22A-D depict portions of a battery assembly at different stages during the manufacturing process according to an embodiment of the disclosure.

FIGS. 22A-D depict a portion of a battery assembly at various stages during its manufacture according to various embodiments. FIG. 22A depicts lid 108 of the battery assembly from two different perspectives: a top view perpendicular to the face of lid 108 and a cross-sectional view along cross-section line 402. As shown in FIG. 22A, lid 108 contains aperture 120 configured to accommodate a feedthrough assembly. According to some embodiments, lid 108 may be constructed from a conducting material such as stainless steel. Dielectric coating 4 coats lid 108 with electrical insulation in order to prevent the formation of lithium dendrites.

Figure 22B:
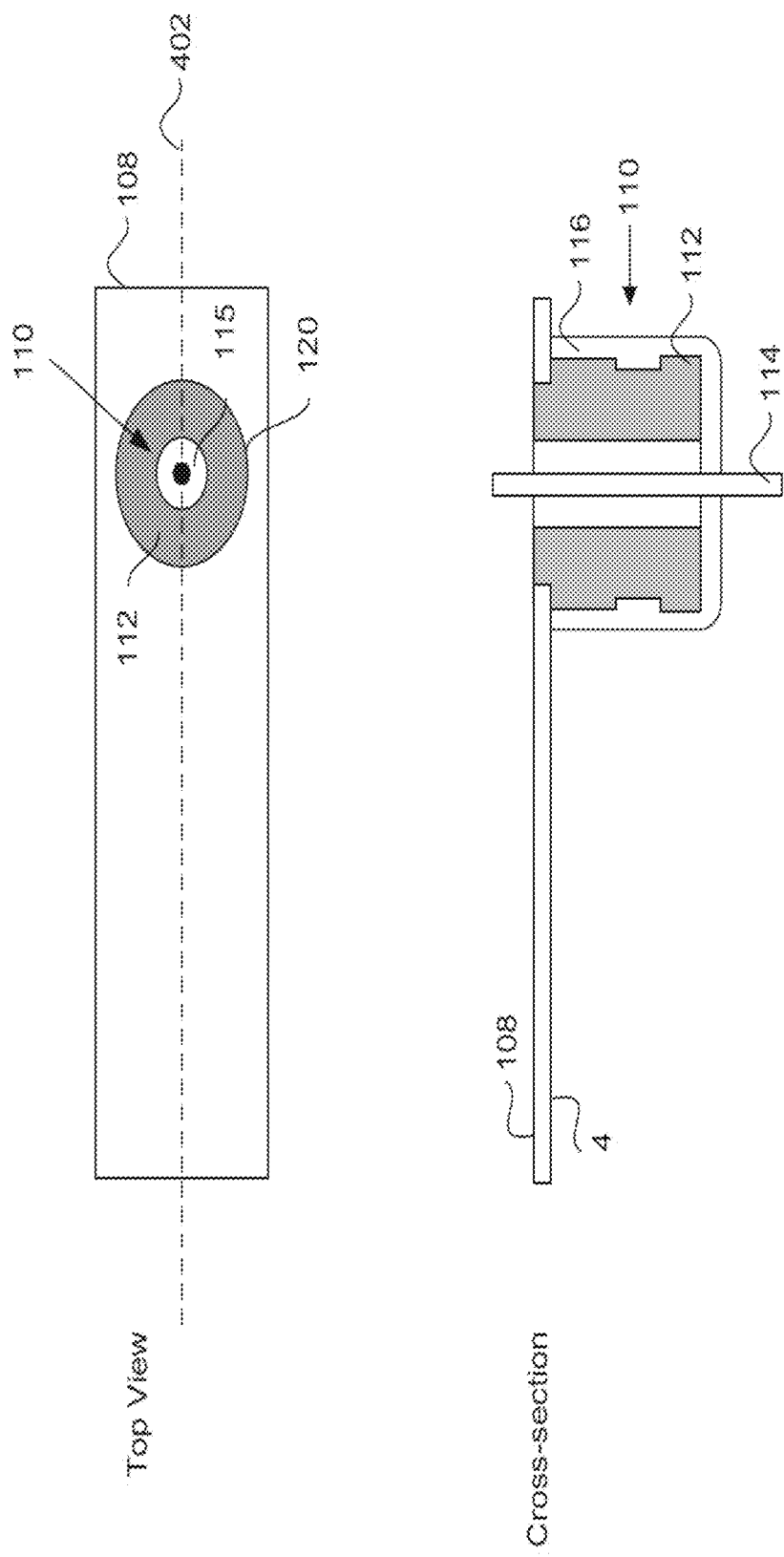

FIG. 22B depicts a portion of the battery assembly after a feedthrough assembly 110 has been fixed in aperture 120. According to the illustrated embodiment, feedthrough assembly 110 includes a ferrule 112, a cathode pin 114, a glass core 115, and overmolded feedthrough insulation 116, the diameter of the feedthrough assembly being substantially similar to the diameter of aperture 120. According to some embodiments, the diameter of feedthrough assembly 110 at the point at which it contacts aperture 120 is closely matched to (e.g., the same as or slightly larger than) the diameter of aperture 120 in order to facilitate attaching feedthrough assembly 110 to lid 108 using a press fit. In certain embodiments, the diameter of feedthrough assembly 110 is at least 5% greater than the diameter of aperture 120. In other embodiments, the diameter of feedthrough assembly 110 is between 10% and 15% greater than the diameter of aperture 120.

Figure 22C:
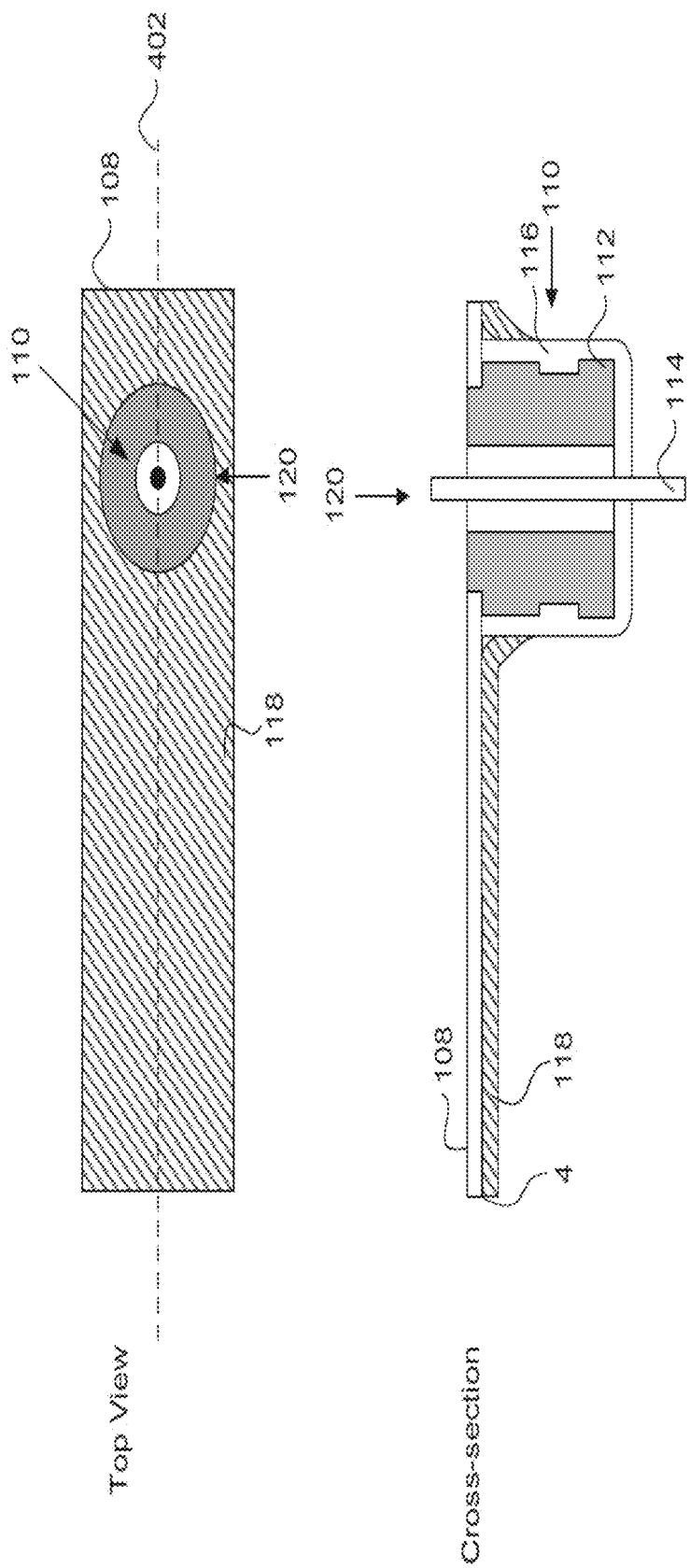

FIG. 22C depicts a portion of the battery assembly after a boot insulating layer 118 has been disposed at least partially beneath and/or adjacent, i.e., next to or adjoining, the dielectric coating 4 of lid 108.

Figure 22D:
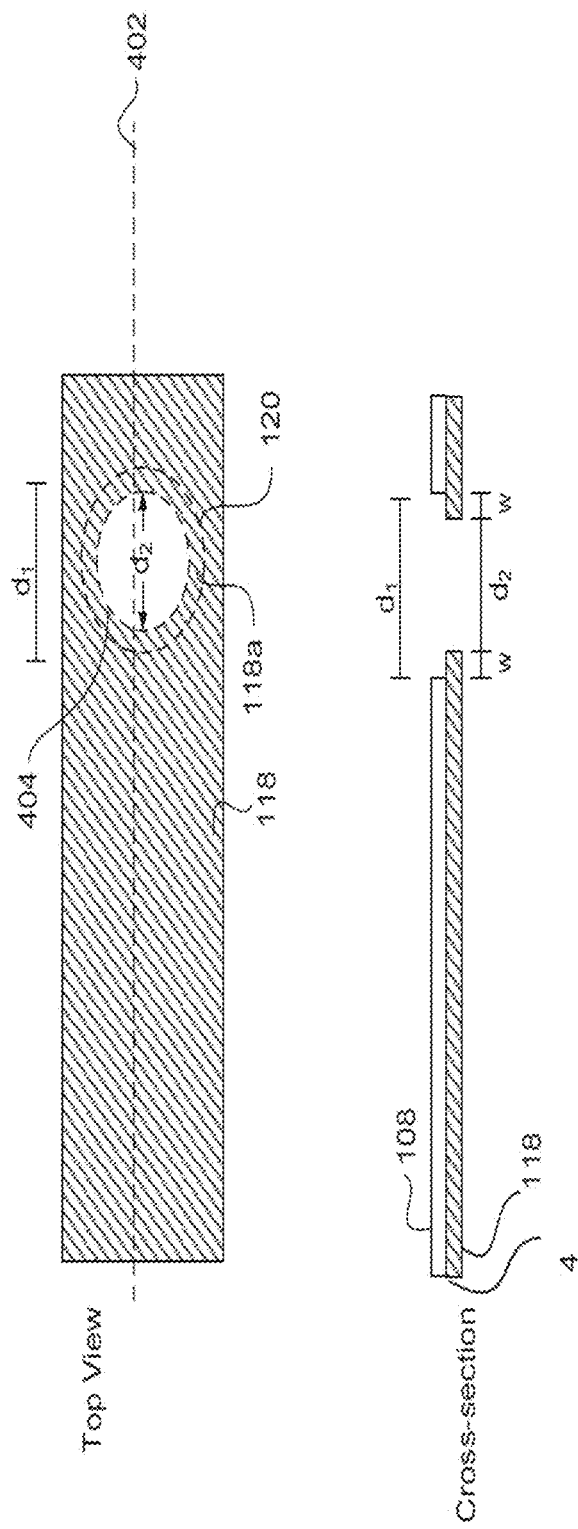

FIG. 22D depicts boot insulating layer 118 overlaid beneath or inward of the dielectric coating 4 of lid 108 without feedthrough assembly 110. This figure is for illustrative purposes only and does not necessarily depict a battery as it would be during any point of its manufacture. As can be seen, the diameter $d_1$ of aperture 120 in lid 108 is greater than the diameter $d_2$ of an aperture 404 in boot insulating layer 118. This has the effect of creating an overlap region 118a with a width w that can engage with feedthrough assembly 110 when boot insulating layer 118 is disposed against the dielectric coating 4 of lid 108, as is depicted in FIG. 22C. According to various embodiments, the diameter $d_1$ of the aperture 120 in lid 108 may be 8-12% larger than the diameter $d_2$ of aperture 404.

Figure 23:
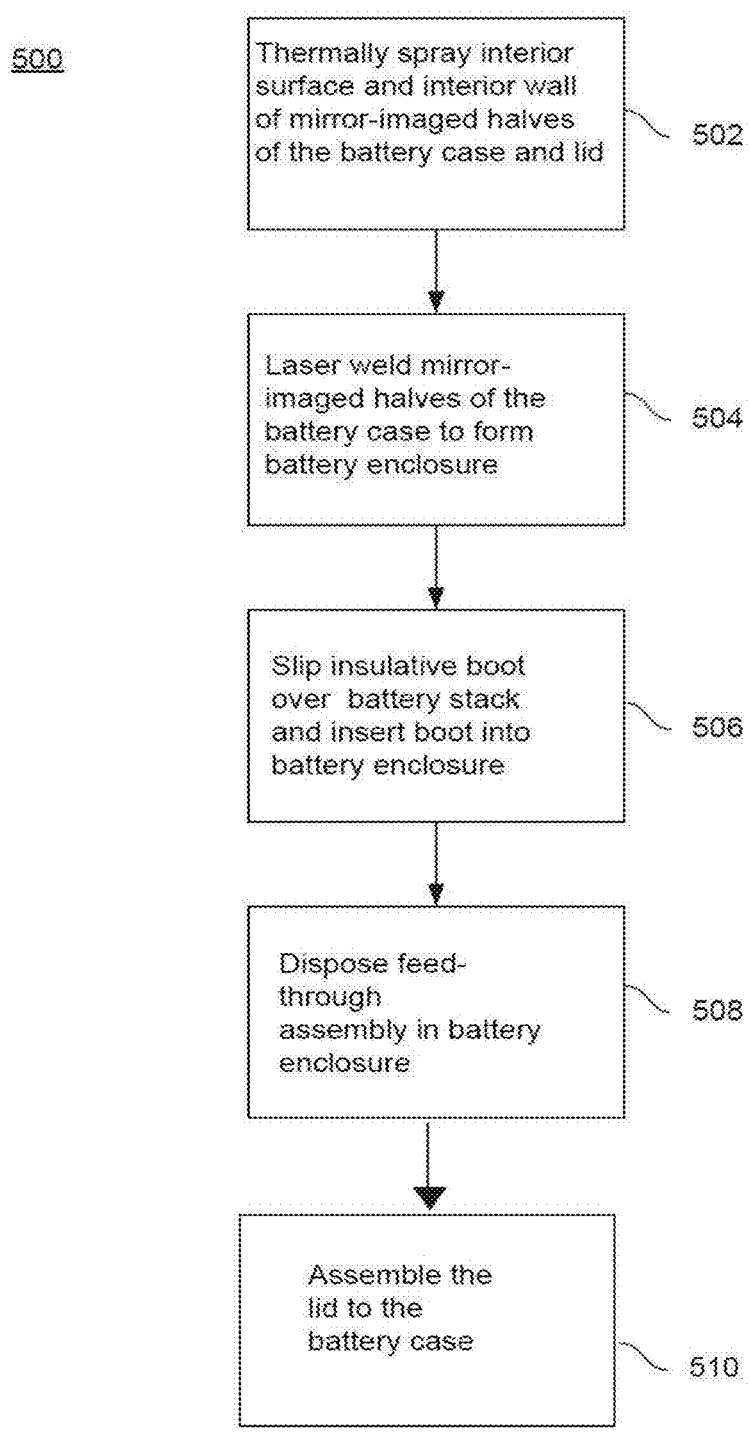
FIG. 23 is a flowchart depicting a method of manufacturing a battery assembly according to an embodiment of the disclosure.

FIG. 23 is a flowchart illustrating a method 500 of assembling a battery assembly according to various embodiments of the invention. For clarity, method 500 is described with reference to FIGS. 19A-22D, however it should be understood that the method is more broadly applicable and not limited to those embodiments.

As shown, at least a portion of the interior walls and the interior surfaces of battery case 2 and battery lid 6 are thermally sprayed to form dielectric coating 4, in step 502. At step 504, mirror-imaged halves of battery case 2 are laser welded to form a battery enclosure. (Although described as mirror-imaged, it will be appreciated that the halves of the battery case need not be mirror-imaged.)

At step 506 an insulating boot 118 is slipped over a battery stack and the boot is inserted into the battery enclosure. At step 508, the feedthrough assembly is disposed in the battery enclosure. In certain embodiments, an interference fit is used between insulating boot 118 and the feedthrough assembly 110. In such embodiments, the overlap region 118a flexes and a portion engages with the feedthrough insulator 116, as shown in FIG. 22C. At step 510, the lid 6 is assembled to the battery case 2 to enclose the cell stack.

Figure 24:
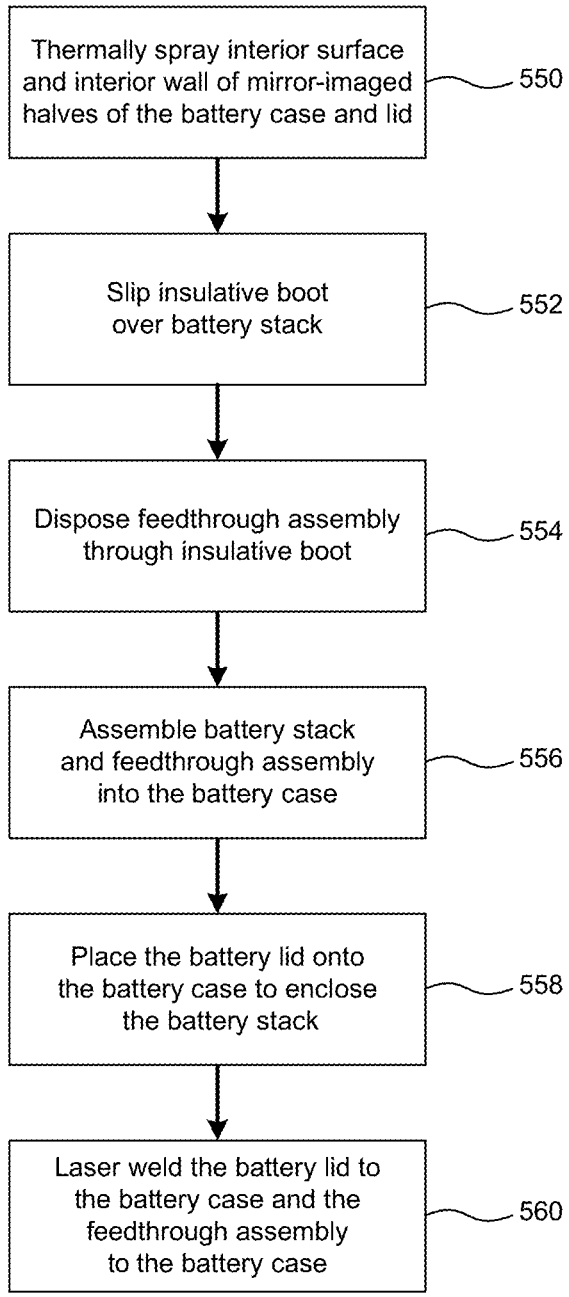
FIG. 24 is a flowchart depicting another method of manufacturing a battery assembly according to an embodiment of the disclosure.

FIG. 24 is a flowchart illustrating another method 600 of assembling a battery assembly according to various embodiments of the invention. Method 600 applies in particular to the battery assembly shown in FIGS. 5 and 6. At a first step 550, at least a portion of the interior walls and the interior surfaces of the mirror-imaged halves of the base 220 and lid 210 of a battery case are thermally sprayed to form a dielectric coating thereon. (Although described as mirror-imaged, it will be appreciated that the halves of the base need not be mirror-imaged.) At a next step 552, insulating boot 310 is slipped over a battery stack. At this point in the method, an overmolded feedthrough assembly may already have been electrically connected to the cathode tab of the battery stack. At step 554, the overmolded feedthrough assembly is inserted through an aperture in the insulating boot. A tool may be used to axially position the feedthrough assembly in the insulating boot aperture. The diameter of the aperture in insulating boot 310 is smaller than the diameter of the feedthrough assembly such that the lip 602 of insulating boot 310 flexes to accommodate substantially the entire circumferential surface of overmolded feedthrough insulation 440 with an interference or compression fit to form a liquid-tight seal. The length of lip 602 may be such that the lip overlaps the overmolded feedthrough assembly by at least 3 times the thickness of the material forming insulating boot 310. The diameter of the overmolded feedthrough assembly may be at least 5% greater than the inner diameter of lip 602 to assure a liquid-tight seal is formed.

At step 556, insulating boot 310, including the battery stack and overmolded feedthrough assembly, is inserted into the base 220 of the battery case. Insulating boot 310 is oriented so that the cathode tabs of the battery stack are at that portion of base 220 containing the dielectric coating. At step 558, battery lid 210 is assembled to base 220 to enclose the cell stack, and at step 560, the assembly is completed by laser welding the lid and the feedthrough assembly to the battery case.

While the invention has been described in the environment of a battery for use in an IMD such as an ICD, a person skilled in the relevant art will understand that the invention may be used with other batteries. A person skilled in the relevant art will further understand that the invention described herein may also be applied to the manufacture of other electrical or electronic devices, such as capacitors, where it is desired to electrically insulate components in a corrosive environment.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

As used herein, "comprising" is an open-ended transitional phrase. A list of elements following the transitional phrase "comprising" is a non-exclusive list, such that elements in addition to those specifically recited in the list may also be present.

The term "or," as used herein, is inclusive; more specifically, the phrase "A or B" means "A, B, or both A and B." Exclusive "or" is designated herein by terms such as "either A or B" and "one of A or B," for example.

The use of indefinite articles "a" and "an" in connection with an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

The term "wherein" is used as an open-ended transitional phrase, to introduce a recitation of a series of characteristics of the structure.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

To summarize the foregoing, according to one aspect of the disclosure, a battery includes a case having a feedthrough port; a feedthrough assembly disposed in the feedthrough port and including an inner conductor and an insulator core separating the inner conductor from the case; and a cell stack disposed within the case, the cell stack including an anode having an anode tab, a first peripheral portion adjacent the anode tab and a second peripheral portion distal from the anode tab; a cathode having a cathode tab, a first peripheral portion adjacent the cathode tab, and a second peripheral portion distal from the cathode tab; and one or more separator layers electrically insulating the anode from the cathode, wherein the anode, the cathode and the one or separator layers are stacked together and the anode is offset from the cathode such that the second peripheral portion of the anode is recessed from the first peripheral portion of the cathode by a first offset distance; and/or the first peripheral portion of the anode may extend outward from the second peripheral portion of the cathode by a second offset distance; and/or the first offset distance may be between 0.001 inches and 0.03 inches; and/or the first offset distance may be between 0.01 inches and 0.02 inches; and/or the feedthrough assembly may further include a ferrule and feedthrough insulation, wherein the ferrule couples to the feedthrough port, the insulator core and the inner conductor are disposed within a lumen of the ferrule, and the feedthrough insulation is disposed circumferentially around a portion of the ferrule that extends into the case; and/or the battery may further include an insulating boot surrounding the cell stack to electrically insulate the cell stack from the case, the insulating boot having an opening configured to receive therein the feedthrough insulation, wherein the insulating boot is sealed to the feedthrough insulation; and/or the insulating boot may include a lip around the opening that overlaps at least a part of the feedthrough insulation and is sealed to the feedthrough insulation; and/or the feedthrough insulation may be fully inserted into the opening of the insulated boot to mate with an inner surface of the lip of the insulating boot, and the lip of the insulating boot may be sealed to the feedthrough insulation; and/or the insulating boot may be sealed to the feedthrough insulation by a heat-seal, a compression joint, an adhesive, or a combination thereof, to form a liquid-tight seal; and/or the insulating boot may be heat-sealed to the feedthrough insulation by a laser weld, an RF weld, a resistance weld, a friction weld, or combinations thereof; and/or the insulating boot may be made of a material selected from the group consisting of polyethylene (PE), ethylenetetrafluoroethylene (ETFE), polyether ether ketone (PEEK), polypropylene (PP), and mixtures thereof; and/or the material of the insulating boot may have an average pore diameter of up to 0.05 micrometers; and/or the anode tab may be electrically connected to the case, and the cathode tab may be electrically connected to the inner conductor of the feedthrough assembly, the inner conductor of the feedthrough assembly being the only cathodic surface disposed in the feedthrough assembly; and/or the cathode tab may be free of cathode active material; and/or the feedthrough insulation may be made of a material selected from the group consisting of polyethylene (PE), ethylenetetrafluoroethylene (ETFE), polyether ether ketone (PEEK), polypropylene (PP), polyurethane (PU), polycarbonate (PC), silicones, and mixtures thereof; and/or the cathode may include a cathode active material, and the battery may further include an electrolyte, wherein a weight ratio of the electrolyte to the cathode active material may be between 0.25 and 0.4; and/or the battery may be a prismatic cell having a volume of between 3 cc and 10 cc; and/or the case may be at least partially coated with a layer of aluminum oxide having a thickness of between about 0.002 inches and about 0.012 inches.

According to another aspect of the disclosure, a battery includes a case having a feedthrough port; a feedthrough assembly disposed in the feedthrough port, the feedthrough assembly including a ferrule, an inner conductor disposed within a lumen of the ferrule, an insulator core disposed within the lumen of the ferrule and separating the inner conductor from the ferrule, and feedthrough insulation circumferentially disposed on the ferrule; a cell stack disposed within the case, the cell stack including an anode having an anode tab, a cathode having a cathode tab, and one or more separator layers electrically insulating the anode from the cathode; and an insulating boot surrounding the cell stack to electrically insulate the cell stack from the case, the insulating boot having an opening configured to receive therein the feedthrough insulation, the insulating boot being sealed to the feedthrough insulation; and/or the insulating boot may include a lip around the opening that overlaps at least part of the feedthrough insulation and is sealed to the feedthrough insulation; and/or the insulating boot may be sealed to the feedthrough insulation by a heat seal, a laser weld, an RF weld, a resistance weld, a friction weld, a compression joint, an adhesive, or a combination thereof to form a liquid-tight seal; and/or the insulating boot may be made of a material selected from the group consisting of polyethylene (PE), ethylenetetrafluoroethylene (ETFE), polyether ether ketone (PEEK), polypropylene (PP), and mixtures thereof; and/or the cathode may include a cathode active material, and the battery may further include an electrolyte, wherein a weight ratio of the electrolyte to the cathode active material may be between 0.25 and 0.4; and/or the insulating boot may comprise a nano-porous material having an average pore diameter of up to 0.05 micrometers; and/or the inner conductor of the feedthrough assembly is the only cathodic surface disposed in the feedthrough assembly; and/or the cathode may include a cathode active material comprising silver vanadium oxide (SVO) or a mixture of SVO and carbon monofluoride (CFx); and/or the case may be at least partially coated with a layer of aluminum oxide having a thickness of between about 0.002 inches and about 0.012 inches.

According to another aspect of the disclosure, a method of manufacturing an electrochemical cell includes thermal spraying a dielectric material on an interior surface of a housing of the electrochemical cell to form an electrically insulating coating on the housing; and/or the dielectric material may be a ceramic oxide; and/or the ceramic oxide may comprise aluminum oxide and/or titanium oxide; and/or the method may further include laser welding a top cover to a bottom cover of the housing to form a battery enclosure, wherein a welded area of the top cover and the bottom cover is at least partially coated with the dielectric material; and/or the method may further include encasing a battery stack with an insulating boot and inserting the insulating boot into the battery enclosure; and/or the thermal spraying step may comprise high-velocity oxygen-fuel (HVOF) spraying.

According to a further aspect of the disclosure, an electrochemical cell includes a battery case that is at least partially coated with a dielectric material to a thickness between about 0.002 inches and about 0.012 inches; and/or the dielectric material may be a ceramic oxide; and/or the ceramic oxide may comprise aluminum oxide and/or titanium oxide; and/or the electrochemical cell may further include an insulating boot enclosed by the battery case such that the insulating boot is adjacent to the dielectric coating.

According to yet another aspect of the disclosure, a method of manufacturing an electrochemical cell includes using high-velocity oxygen-fuel (HVOF) spraying to plate a dielectric material onto an interior surface of a housing of the electrochemical cell to form a dielectric coating that electrically insulates the housing and mitigates the formation of short circuits; and/or the dielectric material may be a ceramic oxide; and/or the ceramic oxide may comprise aluminum oxide and/or titanium oxide; and/or the method may further include laser welding a top cover to a bottom cover of the housing to form a battery enclosure, wherein a welded area of the top cover and/or the bottom cover is at least partially coated with the dielectric material; and/or the method may further include encasing a battery stack with an insulating boot and inserting the insulating boot into the battery enclosure.

According to a still further aspect of the disclosure, a method of manufacturing a battery having a case with a feedthrough port, a feedthrough assembly disposed in the feedthrough port and including an inner conductor and an insulator core separating the inner conductor from the case, and a cell stack disposed within the case, the cell stack including an anode having an anode tab, a first peripheral portion adjacent the anode tab, and a second peripheral portion distal from the anode tab, a cathode having a cathode tab, a first peripheral portion adjacent the cathode tab, and a second peripheral portion distal from the cathode tab, and one or more separator layers insulating the anode from the cathode, the method including stacking the anode, the cathode and the one or more separator layers together; and offsetting the anode from the cathode such that the second peripheral portion of the anode is recessed from the first peripheral portion of the cathode by a first offset distance; and/or the battery may further include a ferrule coupled to the feedthrough port, and the method may further include overmolding feedthrough insulation circumferentially around the ferrule; surrounding the cell stack with an insulating boot to insulate the cell stack from the case, the insulating boot having an opening configured to receive therein the overmolded feedthrough insulation; and sealing the insulating boot to the overmolded feedthrough insulation; and/or the method may further include using high-velocity oxygen-fuel (HVOF) spraying to plate aluminum oxide onto an interior surface of the case to form a coating having a thickness between about 0.002 inches and about 0.12 inches.

According to yet a further aspect of the disclosure, a battery includes a case having an inner surface and a feedthrough port; a layer of a dielectric material disposed over at least a portion of the inner surface of the case, the layer of dielectric material being operable to prevent short circuits; a feedthrough assembly disposed in the feedthrough port, the feedthrough assembly including a ferrule having a lumen, an inner conductor disposed within the lumen of the ferrule, an insulating core disposed within the lumen of the ferrule and separating the inner conductor from the case, and feedthrough insulation disposed circumferentially around a portion of the ferrule positioned in the case; a cell stack disposed within the case, the cell stack including an anode having an anode tab, a first peripheral portion adjacent the anode tab, and a second peripheral port distal from the anode tab, a cathode having a cathode tab, a first peripheral portion adjacent the cathode tab, and a second peripheral portion distal from the cathode tab, and one or more separator layers electrically insulating the anode from the cathode, the anode, the cathode and the one or more separator layers being stacked together with the anode offset from the cathode such that the second peripheral portion of the anode is recessed from the first peripheral portion of the cathode by a first offset distance; and an insulating boot surrounding the cell stack to electrically insulate the cell stack from the case, the insulating boot having an opening, the feedthrough insulation being positioned in the opening and sealed to the insulating boot; and/or the insulating boot may include a lip around the opening that overlaps at least a part of the feedthrough insulation and is sealed to the feedthrough insulation; and/or the insulating boot may form a liquid-tight seal with the feedthrough insulation, the liquid-tight seal being formed by heat-sealing, a compression joint, an adhesive, or a combination thereof; and/or the insulating boot may be heat-sealed to the feedthrough insulation by a laser weld, an RF weld, a resistance weld, a friction weld, or combinations thereof; and/or the insulating boot may comprise a material selected from the group consisting of polyethylene (PE), ethyltetrafluoroethylene (EPFE), polyether ether ketone (PEEK), polypropylene (PP), and mixtures thereof; and/or the material of the insulating boot may have an average pore diameter of up to 0.05 μm; and/or the feedthrough insulation may comprise a material selected from the group consisting of polyethylene (PE), ethyltetrafluoroethylene (ETFE), polyether ether ketone (PEEK), polypropylene (PP), polyurethane (PU), polycarbonate (PC), silicones, and mixtures thereof; and/or the separator layers and the insulating boot may be formed from the same material; and/or the cathode may include a cathode active material, and the battery may further include an electrolyte, wherein a weight of the electrolyte to the cathode active material may be between 0.25 and 0.4; and/or the cathode may include a cathode active material comprising silver vanadium oxide (SVO) or a mixture of SVO and carbon monofluoride (CFx); and/or the first offset distance may be between 0.001 inches and 0.03 inches; and/or the first offset distance may be between 0.01 inches and 0.02 inches.

According to still another aspect of the disclosure, a method of manufacturing an electrochemical cell includes applying a layer of a dielectric material to at least a portion of an interior surface of a housing for the electrochemical cell, the housing having a feedthrough port; assembling a feedthrough assembly to an insulating boot, the insulating boot having an opening and the feedthrough assembly being assembled within the opening; forming an anode by pressing an anode foil against opposite sides of an anode current collector; forming a cathode by laminating a cathode active material on opposite sides of the cathode current collector, the laminating being conducted under a pressure of 30-60 ksi with an active loading range of 71 $mg.cm^{-2}$ to 73 $mg.cm^{-2}$; preparing a cell stack, the cell stack including an anode, a cathode, and one or more separator layers electrically insulating the anode from the cathode, the anode having an anode tab, a first peripheral portion adjacent the anode tab, and a second peripheral portion distal from the anode tab, the cathode having a cathode tab, a first peripheral portion adjacent the cathode tab, and a second peripheral portion distal from the cathode tab, the cell stack being formed by stacking together the anode, the cathode and the one or more separator layers with the anode offset from the cathode so that the second peripheral portion of the anode is recessed from the first peripheral portion of the cathode by a first offset distance; inserting the cell stack into the insulating boot and electrically connecting the cathode tab to the feedthrough assembly to form a covered cell assembly; inserting the covered cell assembly into the housing to form a completed electrochemical cell; and testing the completed electrochemical cell while applying to the completed electrochemical cell a first pulse train of 16 pulses at 4.0 Amps followed by 6 pulses at 4.4 Amps every 24 hours until at least half of the completed electrochemical cell is depleted; and/or the housing may include a first portion and a second portion, and the method may further include assembling the first portion to the second portion; and/or the step of inserting the covered cell assembly into the housing may include positioning the covered cell assembly in the housing so that the cathode tab opposes the layer of the dielectric material; and/or the dielectric material may be a ceramic oxide; and/or the ceramic oxide may comprise aluminum oxide and/or titanium oxide; and/or the ceramic oxide may comprise aluminum oxide, and the layer of the dielectric material may have a thickness of between about 0.002 inches and about 0.012 inches; and/or the applying step may include using high-velocity oxygen-fuel (HVOF) spraying to form the layer of the dielectric material on the portion of the interior surface of the housing; and/or the assembling step may include forming a liquid-tight seal between the feedthrough assembly and the insulating boot.

According to still another aspect of the disclosure, a method of manufacturing an electrochemical cell includes applying a layer of a dielectric material to at least a portion of an interior surface of a housing for the electrochemical cell, the housing having a feedthrough port; assembling a feedthrough assembly to an insulating boot, the insulating boot having an opening and the feedthrough assembly being assembled within the opening; preparing a cell stack, the cell stack including an anode, a cathode, and one or more separator layers electrically insulating the anode from the cathode, the anode having an anode tab, a first peripheral portion adjacent the anode tab, and a second peripheral portion distal from the anode tab, the cathode having a cathode tab, a first peripheral portion adjacent the cathode tab, and a second peripheral portion distal from the cathode tab, the cell stack being formed by stacking together the anode, the cathode and the one or more separator layers with the anode offset from the cathode so that the second peripheral portion of the anode is recessed from the first peripheral portion of the cathode by a first offset distance; inserting the cell stack into the insulating boot and electrically connecting the cathode tab to the feedthrough assembly to form a covered cell assembly; and inserting the covered cell assembly into the housing.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

The invention claimed is:

1. A battery, comprising:
   an outer case formed of metal and having a first cover, a second cover welded to the first cover to define an interior space within the outer case, an inner surface, and a layer of a ceramic dielectric material disposed by thermal spraying on at least a portion of the inner surface of the outer case so that the dielectric material is directly exposed to the interior space;
   a cell stack disposed within the interior space of the outer case, the cell stack including
      an anode having a main anode body and an anode tab projecting from the main anode body;
      a cathode having a main cathode body and a cathode tab projecting from the main cathode body; and
      one or more separator layers disposed between the main anode body and the main cathode body and electrically insulating the anode from the cathode.

2. The battery as claimed in claim 1, wherein the cell stack is positioned in the outer case so that the cathode tab opposes the layer of dielectric material.

3. The battery as claimed in claim 1, wherein the ceramic dielectric material is a ceramic oxide.

4. The battery as claimed in claim 3, wherein the ceramic oxide is selected from the group consisting of aluminum oxide, titanium oxide and combinations thereof.

5. The battery as claimed in claim 4, wherein the ceramic oxide comprises aluminum oxide, and the layer of the dielectric material has a thickness of about 0.004 inches.

6. The battery as claimed in claim 1, wherein the layer of the dielectric material has a thickness of no more than about 0.03 inches.

7. The battery as claimed in claim 1, wherein the layer of the dielectric material has a thickness of between about 0.002 inches and about 0.012 inches.

8. The battery as claimed in claim 1, wherein the layer of ceramic dielectric material is applied to an entirety of the inner surface of the outer case.

* * * * *